(12) United States Patent
Sunkavalli et al.

(10) Patent No.: US 11,257,284 B2
(45) Date of Patent: Feb. 22, 2022

(54) RELIGHTING DIGITAL IMAGES ILLUMINATED FROM A TARGET LIGHTING DIRECTION

(71) Applicant: Adobe Inc., San Jose, CA (US)

(72) Inventors: Kalyan Sunkavalli, San Jose, CA (US); Zexiang Xu, San Diego, CA (US); Sunil Hadap, Dublin, CA (US)

(73) Assignee: Adobe Inc., San Jose, CA (US)

( * ) Notice: Subject to any disclaimer, the term of this patent is extended or adjusted under 35 U.S.C. 154(b) by 99 days.

(21) Appl. No.: 15/930,925

(22) Filed: May 13, 2020

(65) Prior Publication Data

US 2020/0273237 A1   Aug. 27, 2020

Related U.S. Application Data

(63) Continuation of application No. 15/970,367, filed on May 3, 2018, now Pat. No. 10,692,276.

(51) Int. Cl.
*G06K 9/00* (2006.01)
*G06T 15/50* (2011.01)
(Continued)

(52) U.S. Cl.
CPC ........... *G06T 15/506* (2013.01); *G06N 20/00* (2019.01); *G06T 7/70* (2017.01); *G06T 19/20* (2013.01); *G06T 2207/20081* (2013.01)

(58) Field of Classification Search
CPC ........ G06N 3/08; G06N 3/0454; G06N 20/00; G06N 3/0445; G06N 3/04; G06N 3/0472; G06N 3/084; G06N 5/025; G06N 7/005; G06N 5/046; G06N 20/20; G06N 20/10; G06N 3/0481; G06N 5/003; G06N 3/088; G06N 3/006; G06N 3/008; G06N 3/02;
(Continued)

(56) References Cited

U.S. PATENT DOCUMENTS

2008/0221734 A1   9/2008   Nagao et al.
2014/0195468 A1   7/2014   Mohammadi et al.
(Continued)

OTHER PUBLICATIONS

Ikehata, "CNN-PS: CNN-based Photometric Stereo for General Non-Convex Surfaces," arXiv Aug. 2018 (Year: 2018).*
(Continued)

*Primary Examiner* — Alex Kok S Liew
(74) *Attorney, Agent, or Firm* — Keller Jolley Preece

(57) ABSTRACT

The present disclosure relates to using an object relighting neural network to generate digital images portraying objects under target lighting directions based on sets of digital images portraying the objects under other lighting directions. For example, in one or more embodiments, the disclosed systems provide a sparse set of input digital images and a target lighting direction to an object relighting neural network. The disclosed systems then utilize the object relighting neural network to generate a target digital image that portrays the object illuminated by the target lighting direction. Using a plurality of target digital images, each portraying a different target lighting direction, the disclosed systems can also generate a modified digital image portraying the object illuminated by a target lighting configuration that comprises a combination of the different target lighting directions.

20 Claims, 14 Drawing Sheets

(51) Int. Cl.
    *G06T 19/20* (2011.01)
    *G06T 7/70* (2017.01)
    *G06N 20/00* (2019.01)
(58) Field of Classification Search
    CPC .......... G06N 3/082; G06N 3/086; G06N 3/10;
        G06T 2207/20084; G06T 2207/20081;
        G06T 7/0012; G06T 7/11; G06T 5/50;
        G06T 5/002; G06T 2207/10016
    See application file for complete search history.

(56) References Cited

U.S. PATENT DOCUMENTS

| | | | | |
|---|---|---|---|---|
| 2018/0012411 | A1* | 1/2018 | Richey | G06T 19/006 |
| 2019/0066369 | A1 | 2/2019 | Peng | |
| 2019/0333198 | A1* | 10/2019 | Wang | G06N 3/0454 |
| 2019/0340810 | A1 | 11/2019 | Sunkavalli et al. | |

OTHER PUBLICATIONS

Aayush Bansal, Bryan Russell, and Abhinav Gupta. 2016. Marr Revisited: 2D-3D Model Alignment via Surface Normal Prediction. CVPR (2016).
Ronen Basri and David W. Jacobs. 2003. Lambertian Reflectance and Linear Subspaces. IEEE Trans. Pattern Anal. Mach. Intell. 25, 2 (Feb. 2003), 218-233.
Peter N. Belhumeur and David J. Kriegman. 1998. What is the Set of Images of an Object Under All Possible Illumination Conditions? International Journal of Computer Vision 28, 3 (Jul. 1, 1998), 245-260.
Brett Burley. 2012. Physically-based shading at Disney. In ACM SIGGRAPH 2012 Courses.
Ayan Chakrabarti. 2016. Learning sensor multiplexing design through back-propagation. In Advances in Neural Information Processing Systems. 3081-3089.
Manmohan Chandraker. 2016. The information available to a moving observer on shape with unknown, isotropic BRDFs. IEEE transactions on pattern analysis and machine intelligence 38, 7 (2016), 1283-1297.
Paul Debevec, Tim Hawkins, Chris Tchou, Haarm-Pieter Duiker, Westley Sarokin, and Mark Sagar. 2000. Acquiring the reflectance field of a human face. In Proceedings of the 27th annual conference on Computer graphics and interactive techniques. ACM Press/Addison-Wesley Publishing Co., 145-156.
David Eigen and Rob Fergus. 2015. Predicting Depth, Surface Normals and Semantic Labels with a Common Multi-Scale Convolutional Architecture. ICCV (2015).
Per Einarsson, Charles-Felix Chabert, Andrew Jones, Wan-Chun Ma, Bruce Lamond, Tim Hawkins, Mark T Bolas, Sebastian Sylwan, and Paul E Debevec. 2006. Relighting Human Locomotion with Flowed Reflectance Fields. Rendering techniques 2006 (2006), 17th.
John Flynn, Ivan Neulander, James Philbin, and Noah Snavely. 2016. DeepStereo: Learning to Predict New Views From the World's Imagery. In CVPR.
Martin Fuchs, Volker Blanz, Hendrik Lensch, and Hans-Peter Seidel. 2007. Adaptive sampling of reflectance fields. ACM Transactions on Graphics (TOG) 26, 2 (2007), 10.
Marc-André Gardner, Kalyan Sunkavalli, Ersin Yumer, Xiaohui Shen, Emiliano Gambaretto, Christian Gagné, and Jean-François Lalonde. 2017. Learning to Predict Indoor Illumination from a Single Image. ACM Transactions on Graphics (SIGGRAPH Asia) 9, 4 (2017).
Stamatios Georgoulis, Konstantinos Rematas, Tobias Ritschel, Mario Fritz, Tinne Tuytelaars, and Luc Van Gool. 2017. What is Around the Camera?. In ICCV.
Dan B Goldman, Brian Curless, Aaron Hertzmann, and Steven M Seitz. 2010. Shape and spatially-varying brdfs from photometric stereo. IEEE Transactions on Pattern Analysis and Machine Intelligence 32, 6 (2010), 1060-1071.
Yannick Hold-Geoffroy, Kalyan Sunkavalli, Sunil Hadap, Emiliano Gambaretto, and Jean-François Lalonde. 2017. Deep Outdoor Illumination Estimation. In CVPR.
Z. Hui and A. C. Sankaranarayanan. 2017. Shape and Spatially-Varying Reflectance Estimation from Virtual Exemplars. IEEE Transactions on Pattern Analysis and Machine Intelligence 39, 10 (Oct. 2017), 2060-2073. https://doi.org/10.1109/TPAMI.2016.2623613.
Wenzel Jakob. 2010. Mitsuba renderer. (2010). http://www.mitsuba-renderer.org.
Nima Khademi Kalantari, Ting-Chun Wang, and Ravi Ramamoorthi. 2016. Learningbased view synthesis for light field cameras. ACM Transactions on Graphics (TOG) 35, 6 (2016), 193.
Eric P Lafortune and Yves D Willems. 1993. Bi-directional path tracing. (1993).
Xiao Li, Yue Dong, Pieter Peers, and Xin Tong. 2017. Modeling surface appearance from a single photograph using self-augmented convolutional neural networks. ACM Transactions on Graphics (TOG) 36, 4 (2017), 45.
Guilin Liu, Duygu Ceylan, Ersin Yumer, Jimei Yang, and Jyh-Ming Lien. 2017. Material Editing Using a Physically Based Rendering Network. In ICCV. 2261-2269.
Dhruv Mahajan, Ira Kemelmacher Shlizerman, Ravi Ramamoorthi, and Peter Belhumeur. 2007. A Theory of Locally Low Dimensional Light Transport. ACM Trans. Graph. 26, 3, Article 62 (Jul. 2007).
Tom Malzbender, Dan Gelb, and Hans Wolters. 2001. Polynomial Texture Maps. In Proceedings of the 28th Annual Conference on Computer Graphics and Interactive Techniques (SIGGRAPH '01). 519-528.
Wojciech Matusik, Matthew Loper, and Hanspeter Pfister. 2004. Progressively-Refined Reflectance Functions from Natural Illumination. In Eurographics Workshop on Rendering, Alexander Keller and Henrik Wann Jensen (Eds.).
Shree K. Nayar, Peter N. Belhumeur, and Terry E. Boult. 2004. Lighting Sensitive Display. ACM Trans. Graph. 23, 4 (Oct. 2004), 963-979.
Ren Ng, Ravi Ramamoorthi, and Pat Hanrahan. 2003. All-frequency shadows using non-linear wavelet lighting approximation. In ACM Transactions on Graphics (TOG), vol. 22. ACM, 376-381.
Jannik Boll Nielsen, Henrik Wann Jensen, and Ravi Ramamoorthi. 2015. On optimal, minimal BRDF sampling for reflectance acquisition. ACM Transactions on Graphics (TOG) 34, 6 (2015), 186.
Geoffrey Oxholm and Ko Nishino. 2016. Shape and reflectance estimation in the wild. IEEE Transactions on Pattern Analysis and Machine Intelligence (TPAMI) 38, 2 (2016), 376-389.
Pieter Peers and Philip Dutré. 2005. Inferring reflectance functions from wavelet noise. In Proceedings of the Sixteenth Eurographics conference on Rendering Techniques. Eurographics Association, 173-182.
Pieter Peers, Dhruv K Mahajan, Bruce Lamond, Abhijeet Ghosh, Wojciech Matusik, Ravi Ramamoorthi, and Paul Debevec. 2009. Compressive light transport sensing. ACM Transactions on Graphics (TOG) 28, 1 (2009), 3.
Ravi Ramamoorthi and Pat Hanrahan. 2001. On the relationship between radiance and irradiance: determining the illumination from images of a convex Lambertian object. J. Opt. Soc. Am. A 18, 10 (Oct. 2001), 2448-2459.
Dikpal Reddy, Ravi Ramamoorthi, and Brian Curless. 2012. Frequency-space Decomposition and Acquisition of Light Transport Under Spatially Varying Illumination. In Proceedings of the 12th European Conference on Computer Vision—vol. Part VI (ECCV'12). Springer-Verlag, Berlin, Heidelberg, 596-610. https://doi.org/10.1007/978-3-642-33783-3_43.
Konstantinos Rematas, Tobias Ritschel, Mario Fritz, Efstratios Gavves, and Tinne Tuytelaars. 2016. Deep reflectance maps. In Proceedings of the IEEE Conference on Computer Vision and Pattern Recognition. 4508-4516.
Peiran Ren, Yue Dong, Stephen Lin, Xin Tong, and Baining Guo. 2015. Image based relighting using neural networks. ACM Transactions on Graphics (TOG) 34, 4 (2015), 111.

(56) References Cited

OTHER PUBLICATIONS

O. Ronneberger, P.Fischer, and T. Brox. 2015. U-Net: Convolutional Networks for Biomedical Image Segmentation. In Medical Image Computing and Computer-Assisted Intervention (MICCAI) (LNCS), vol. 9351. Springer, 234-241.
Christopher Schwartz, Michael Weinmann, Roland Ruiters, and Reinhard Klein. 2011. Integrated High-Quality Acquisition of Geometry and Appearance for Cultural Heritage. In VAST. Eurographics Association, 25-32.
Amnon Shashua. 1997. On Photometric Issues in 3D Visual Recognition from a Single 2D Image. International Journal of Computer Vision 21, 1 (Jan. 1, 1997), 99-122.
Peter-Pike Sloan, Jesse Hall, John Hart, and John Snyder. 2003. Clustered Principal Components for Precomputed Radiance Transfer. ACM Trans. Graph. 22, 3 (Jul. 2003), 382-391.
Kalyan Sunkavalli, Todd Zickler, and Hanspeter Pfister. 2010. Visibility Subspaces: Uncalibrated Photometric Stereo with Shadows. In ECCV. 251-264.
Bruce Walter, Stephen R Marschner, Hongsong Li, and Kenneth E Torrance. 2007. Microfacet models for refraction through rough surfaces. In Proceedings of the 18th Eurographics conference on Rendering Techniques. Eurographics Association, 195-206.
Jiaping Wang, Yue Dong, Xin Tong, Zhouchen Lin, and Baining Guo. 2009. Kernel Nyström method for light transport. In ACM Transactions on Graphics (TOG), vol. 28. ACM, 29.
Robert J. Woodham. 1980. Photometric Method for Determining Surface Orientation From Multiple Images. Optical Engineering 19 (1980), 19-19-6.
Zexiang Xu, Jannik Boll Nielsen, Jiyang Yu, Henrik Wann Jensen, and Ravi Ramamoorthi. 2016. Minimal BRDF sampling for two-shot near-field reflectance acquisition. ACM Transactions on Graphics (TOG) 35, 6 (2016), 188.
U.S. Appl. No. 15/970,367, Feb. 13, 2020, Notice of Allowance.

* cited by examiner

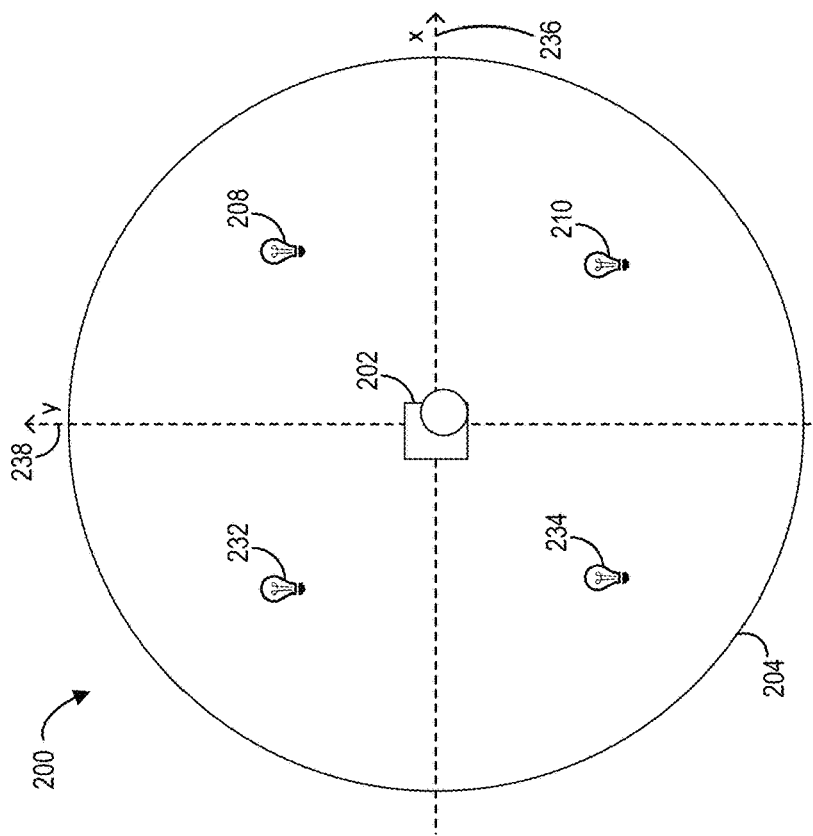
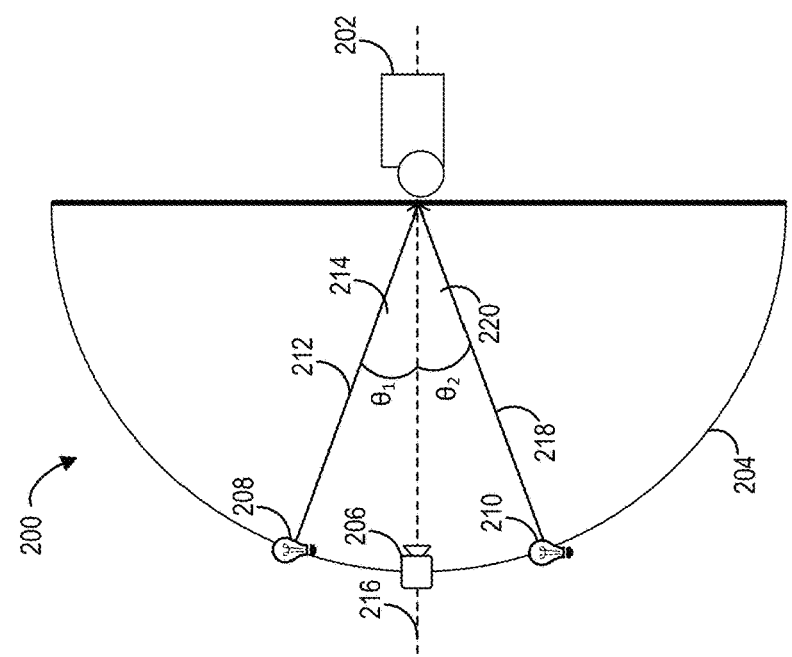
Fig. 2B
Fig. 2A

RELIGHTING DIGITAL IMAGES ILLUMINATED FROM A TARGET LIGHTING DIRECTION

CROSS-REFERENCE TO RELATED APPLICATIONS

The present application is a continuation of U.S. application Ser. No. 15/970,367, filed on May 3, 2018. The aforementioned application is hereby incorporated by reference in its entirety.

BACKGROUND

Developers have significantly improved hardware and software solutions for digital image editing and manipulation. Indeed, conventional digital image editing systems can generate digital images that reflect interactions between objects portrayed in a digital image and modifications to their surrounding environments. For example, some conventional digital image editing systems can generate digital images that reflect additional or modified light sources illuminating an environment. To illustrate, some conventional image editing systems generate models of object geometry, physical material properties, and lighting and then create digital images by modeling light interaction based on these properties. Moreover, some conventional image editing systems capture hundreds of digital images of an object with different light sources and then selectively combine these digital images to generate new digital images with different lighting configurations.

Although these conventional systems can generate digital images with modified light, they have several technological shortcomings in relation to accuracy, efficiency, and flexibility. For example, conventional image editing systems are typically inaccurate in producing images of objects realistically interacting with alternate lighting conditions. To illustrate, due to the complexity of modeling object geometry and material properties, conventional image editing systems often make numerous assumptions in order to come to a solution. Consequently, these models fail to generate digital images that accurately reflect objects in new lighting conditions. Similarly, conventional systems that combine existing digital images often fail to have sufficient source images to accurately portray differently lighting conditions. Accordingly, conventional systems often fail to generate digital images that accurately portray complex objects under novel lighting and/or sophisticated lighting effects, such as specular highlights, shadows, or inter-reflections.

In addition to accuracy concerns, conventional image relighting systems are also inefficient. For example, as mentioned above, conventional systems that combine digital images often require hundreds or thousands of source images of an object illuminated by different lighting conditions. Acquiring, storing, and processing such high-volume digital images places exorbitant storage and processing demands on computer systems. Similarly, conventional systems that attempt to directly model object geometry, material properties, and lighting require significant computing resources and time to generate resulting digital images.

In addition to problems with accuracy and efficiency, conventional systems are also inflexible. Indeed, conventional systems that combine hundreds of digital images require users to rigidly capture hundreds of digital images of an object. This rigidity makes such systems impractical to utilize in most circumstances. Similarly, conventional systems that model physical properties operate in conjunction with limited types of objects, such as simple animations, but cannot flexibly apply to a wide range of complex (e.g., real-world) objects.

SUMMARY

One or more embodiments described herein provide benefits and/or solve one or more of the foregoing or other problems in the art with systems, methods, and non-transitory computer readable storage media that train and utilize a deep-learning neural network model to generate digital images portraying objects illuminated under novel lighting based on a small sample of input digital images portraying the objects under calibrated lighting. For example, in one or more embodiments the disclosed systems utilize an object relighting neural network trained to generate a target digital image of an object illuminated from a target lighting direction based on five or fewer input digital images. To illustrate, in one or more embodiments, the disclosed systems train an object relighting neural network based on training images, training lighting directions, and ground truth digital images. Upon training, the disclosed systems can identify a set of input digital images portraying an object. The object relighting neural network then utilizes the trained object relighting neural network to generate a target digital image that portrays the object illuminated from a target lighting direction. In this manner, the disclosed systems can efficiently, accurately, and flexibly generate digital images illuminated under different lighting conditions with a sparse number of initial digital images, even for digital images that include complex geometric shapes, materials, and lighting effects.

The following description sets forth additional features and advantages of one or more embodiments of the disclosed systems, computer readable storage media, and methods. In some cases, such features and advantages will be obvious to a skilled artisan from the description or may be learned by the practice of the disclosed embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIGS. 2A-2B illustrate capturing digital images of an object illuminated from different light directions in accordance with one or more embodiments;

DETAILED DESCRIPTION

Figure 1:
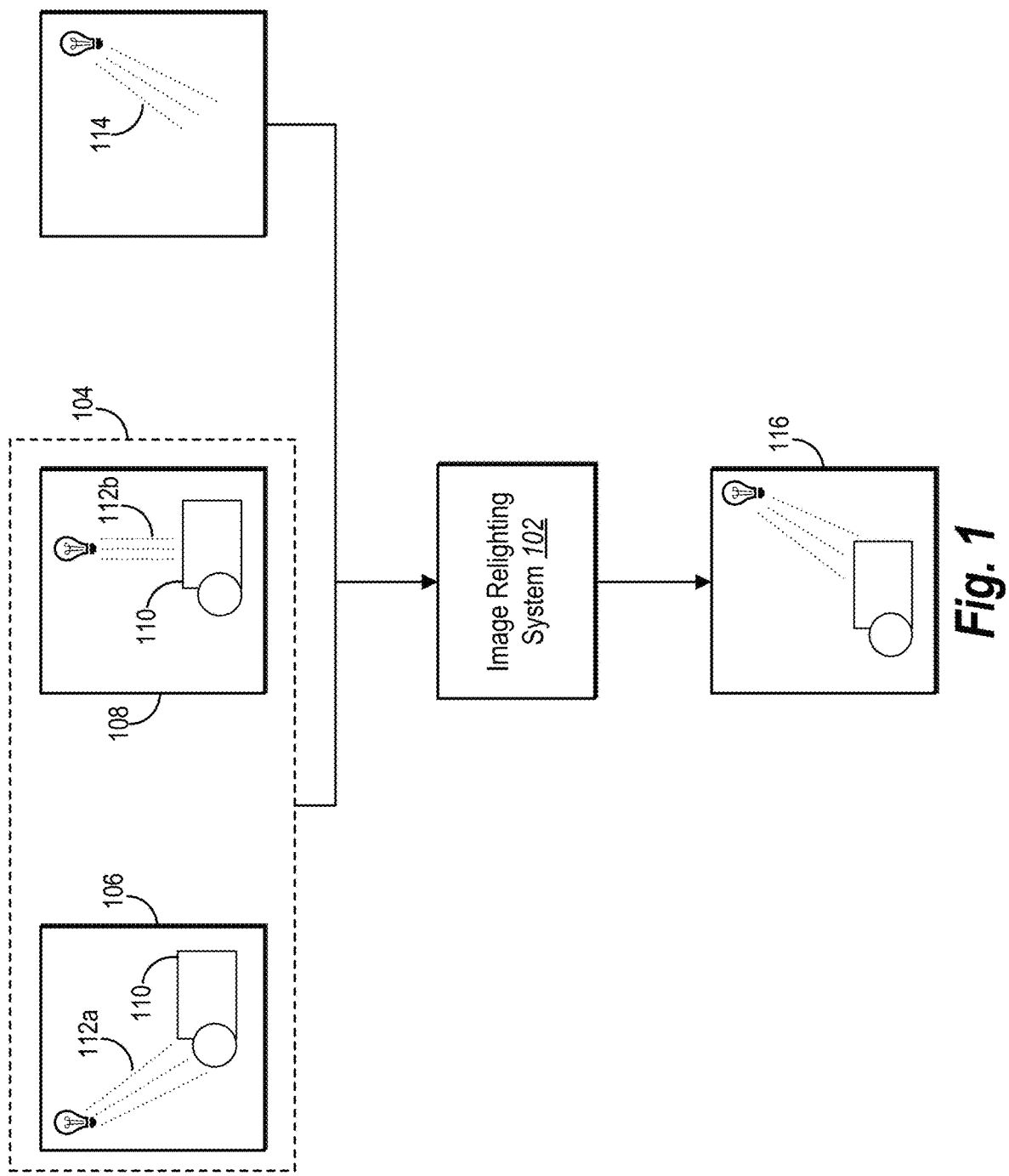
FIG. 1 illustrates a block diagram of the image relighting system generating a target digital image in accordance with one or more embodiments.

One or more embodiments described herein include an image relighting system that utilizes a neural network to generate digital images portraying objects illuminated from target lighting directions based on a sparse number of input digital images (e.g., five or fewer) portraying the objects illuminated under initial lighting directions. In one or more embodiments, the image relighting system trains an object relighting neural network to generate digital images of an object illuminated from a new lighting direction. Once trained, the image relighting system can provide a target lighting direction and a set of input digital images (each input digital image portraying an object illuminated from a different lighting direction) to the object relighting neural network. The object relighting neural network analyzes the set of input digital images to generate a target digital image that portrays the object illuminated from the target lighting direction. Indeed, in one or more embodiments, the system utilizes the object relighting neural network to generate a plurality of target digital images and then combines the target digital images to generate a modified digital image portraying the object illuminated from a variety of different source lights from a variety of different lighting directions.

To provide an exemplary illustration, in one or more embodiments, the image relighting system trains an object relighting neural network to generate target digital images. In particular, the image relighting system can identify a set of training digital images where each training digital image portrays a training object illuminated from a different lighting direction. Additionally, in one or more embodiments, the image relighting system identifies a new lighting direction and a ground truth image portraying the training object illuminated from the new lighting direction. The image relighting system can then train the object relighting neural network by using the neural network to generate a new digital image based on the set of training digital images. Specifically, the image relighting system can train the object relighting neural network by comparing the new digital image generated by the object relighting neural network with the ground truth image (e.g., by utilizing a loss function). Using the trained object relighting neural network, the image relighting system can receive input digital images of an object and generate a target digital image portraying the object illuminated from a target lighting direction.

As just mentioned, in one or more embodiments the image relighting system uses a trained object relighting neural network to generate a target digital image of an object illuminated from a target lighting direction based on set of input digital images. In particular, the image relighting system can identify a set of input digital images where each digital image portrays the object illuminated from a different lighting direction. For example, a first input digital image can portray the object illuminated from a first lighting direction and a second input digital image can portray the object illuminated from a second lighting direction. In some embodiments, the image relighting system provides a set of five or fewer input digital images to the object relighting neural network to generate the target digital image.

In one or more embodiments, the image relighting system provides the set of input digital images to the object relighting neural network by generating and providing sets of color channels corresponding to the set of input digital images. For example, the image relighting system can generate and provide a first set of color channels corresponding to a first input digital image and a second set of color channels corresponding to a second input digital image. In particular, each set of color channels comprises color values reflecting pixels of the respective input digital image. In one or more embodiments, each set of color channels comprises three color channels, each channel including color values for a color within the RGB color model.

In some embodiments, the image relighting system additionally provides the object relighting neural network with a set of light direction channels corresponding to each input digital image. For example, the image relighting system can provide a first set of light direction channels corresponding to a first input digital image. In particular, the first set of light direction channels can include coordinates corresponding to the first lighting direction. In some embodiments, the coordinates reflect the positioning of a light source as projected onto a two-dimensional plane or unit hemisphere projected around the object.

In one or more embodiments, the image relighting system generates/captures the set of input digital images and selects the light directions for each input digital image. For example, in one or more embodiments, the image relighting system identifies a predetermined lighting range and selects the first lighting direction by sampling from the predetermined lighting range. The image relighting system can then generate or capture a digital image of the object from the first lighting direction. In this manner, the image relighting system can generate a set of input digital images. For instance, the image relighting system can generate four digital images from four different lighting directions from four different quadrants of a unit hemisphere.

Additionally, the image relighting system can also provide the object relighting neural network with a target lighting direction. In particular, in some embodiments, the image relighting system generates and provides a set of target direction channels that include coordinates corresponding to the target lighting direction. The target lighting direction differs from the lighting directions portrayed by the input digital images. In some embodiments, the coordinates reflect the positioning of a light source corresponding to the target lighting direction as projected onto a two-dimensional plane or unit hemisphere.

Further, as mentioned, the image relighting system can use the object relighting neural network to generate a target digital image. In particular, the image relighting system can analyze a set of input digital images (i.e., sets of color channels corresponding to the input digital images), a set of input lighting directions (i.e., sets of input direction channels) and a target lighting direction (i.e., a set of target direction channels) to generate a target digital image portraying an object in a target lighting direction.

In one or more embodiments, the image relighting system generates a plurality of target digital images. Indeed, as mentioned above, the image relighting system can use a plurality of target digital images to generate a modified digital image portraying a more complex lighting configuration. For example, the image relighting system can use the object relighting neural network to generate a plurality of target digital images of an object illuminated from a plurality of target lighting directions. Based on the plurality of target digital images, the image relighting system can generate a modified digital image portraying the object illuminated from the plurality of target lighting directions.

The image relighting system provides several advantages over conventional systems. For example, the image relighting system improves accuracy of implementing computing systems. In particular, by training an object relighting neural network to generate target digital images, the image relighting system improves the accuracy of target digital images portraying objects illuminated from target lighting directions. For example, using a trained object relighting neural network allows the image relighting system to avoid assumptions about the properties of an object that may fail as those properties increase in complexity. Moreover, by utilizing a trained object relighting neural network, the image relighting system can accurately replicate sophisticated lighting effects, such as specularities, shadows, or reflections in relation to intricate or composite objects portrayed in digital images.

Further, the image relighting system improves efficiency. In particular, by utilizing an object relighting neural network the image relighting system can generate target digital images using five or fewer digital input images. Accordingly, the object relighting neural network can generate target digital images with significantly less time and computing burden relative to conventional systems. For example, because less input data (i.e., a fewer number of input digital images) is needed to generate the target digital image, the image relighting system reduces the amount of memory required to store input data. Further, the capability of the image relighting system to generate target digital images based on fewer input digital images reduces the processing time and power required to process the input digital images. Moreover, as described in greater detail below, the image relighting system can also generate and utilize synthetic digital objects and corresponding training digital images to more efficiently train the object relighting neural network.

The image relighting system also improves flexibility of implementing computing devices. For example, the image relighting system enables image-based relighting for novice users without access to expensive hardware (e.g., hardware for capturing hundreds of digital images from different lighting directions). Moreover, the image relighting system can apply to any variety or type of real-world or animated digital objects. Thus, the image relighting system can flexibly generate target digital images for a wide array of geometries, materials, or illuminations.

As illustrated by the foregoing discussion, the present disclosure utilizes a variety of terms to describe features and benefits of the image relighting system. Additional detail is now provided regarding the meaning of these terms. As used herein, the term "digital image" refers to any digital symbol, picture, icon, or illustration. For example, the term digital image includes digital files with the following file extensions: JPG, TIFF, BMP, PNG, RAW, or PDF.

Additionally, as used herein, the term "neural network" refers to a machine learning model that can be tuned (e.g., trained) based on inputs to approximate unknown functions. In particular, the term neural network can include a model of interconnected neurons that communicate and learn to approximate complex functions and generate outputs based on a plurality of inputs provided to the model. For instance, the term neural network includes one or more machine learning algorithms. In particular, the term neural network can include deep convolutional neural networks (i.e., "CNNs"). In addition, a neural network is an algorithm (or set of algorithms) that implements deep learning techniques that utilize a set of algorithms to model high-level abstractions in data.

Further, as used herein, the term "lighting direction" refers to an orientation of a path traveled by light. In particular, a lighting direction includes an orientation of a light source relative to a reference (e.g., relative to an object and/or a camera). For example, a lighting direction includes a direction between an object and a light source that indicates the direction of light traveled between the light source and the object. Lighting direction can be described in terms of a variety of values (e.g., coordinates of a two-dimensional plane or unit hemisphere or one or more angles).

Moreover, as used herein, the term "light direction range" refers to window or area of directions, angles, or coordinates. In particular, a light direction range includes a window or area of directions, angles, or coordinates for sampling a lighting direction. For example, a light direction range refers to a predetermined bounded area within which a light source may be positioned in generating a training digital image.

Further, as used herein, the term "color values" refers to qualitative or quantitative values describing the color of an object. In particular, color values include numerical values within a range of values defined by a color model that describe the color of an object. Thus, a color value can include a numerical red, blue, or green value within an RGB color model but or a numerical value within a CMYK model, a HSV model, or a HCL model.

Referring now to the figures, FIG. 1 illustrates a block diagram for generating a target digital image portraying an object illuminated from a target lighting direction in accordance with one or more embodiments. As shown in FIG. 1, the image relighting system uses a set of input digital images and a target lighting direction to generate the target digital image. For simplicity, FIG. 1 illustrates a set of input digital images including two input digital images; however, it should be noted that the image relighting system can use a set of input digital images that includes any number of digital images. In some embodiments, the image relighting system restricts the set of input digital images to five or fewer (e.g., four) input digital images.

As can be seen in FIG. 1, the image relighting system 102 uses a set of input digital images 104 and a target lighting direction 114 to generate a target digital image 116. In one or more embodiments, the image relighting system 102 provides the set of input digital images 104 and the target lighting direction 114 to an object relighting neural network trained to generate target digital images as will be discussed in more detail below with reference to FIG. 6.

In relation to FIG. 1, the set of input digital images 104 includes a first input digital image 106 and a second input digital image 108. In particular, each input digital image portrays an object 110 illuminated from a different lighting direction. For example, the first input digital image 106 portrays the object 110 illuminated from a first light direction 112a and the second input digital image 108 portrays the object 110 illuminated from a second lighting direction 112b. As can be seen in FIG. 1, the object 110 captured in the input digital images 106-108 can be made from a combination of multiple objects.

As shown in FIG. 1, the target lighting direction 114 differs from the lighting directions portrayed in the first input digital image 106 and the second input digital image 108. In particular, the target lighting direction 114 indicates to the image relighting system 102 the lighting direction from which the object 110 should be illuminated in the resulting target digital image. Indeed, the image relighting system 102 generates the target digital image 116 to portray the object 110 illuminated by the target lighting direction 114. Thus, the image relighting system 102 can generate digital images in which an object is portrayed illuminated from a previously unobserved (i.e., uncaptured) lighting direction.

As mentioned above, each input digital image portrays an object illuminated from a different lighting direction. In particular, each input digital image includes an image of an object captured (e.g., by a camera) under an observed lighting direction. FIGS. 2A-2B illustrate capturing digital images of an object illuminated from different lighting directions in accordance with one or more embodiments. Specifically, FIGS. 2A-2B show one or more embodiments in which the image relighting system is configured to accept a set of four input digital images where each digital image portrays an object illuminated from a light direction provided by one of four light sources.

For example, FIG. 2A illustrates a side view of a digital image capturing configuration 200 used by one or more embodiments for capturing digital images. As shown in FIG. 2A, the digital image capturing configuration 200 includes an object 202 positioned at the center of a hemisphere 204. Additionally, the digital image capturing configuration 200 includes a camera 206, a first light source 208, and a second light source 210 positioned along the surface of the hemisphere 204 and directed towards the object 202. Though FIG. 2A only illustrates two light sources in the digital image capturing configuration 200, as will be discussed with reference to FIG. 2B, the digital image capturing configuration 200 includes two additional light sources that are not currently visible.

The image relighting system can utilize the digital image capturing configuration 200 to capture digital images of real-world objects or synthetic objects. For example, the image relighting system can utilize a real camera to capture a digital image of a real-world object with real-world light sources positioned as shown in FIG. 2A. Similarly, the image relighting system can render a digital image of a synthetic object illuminated by synthetic light sources in a virtual environment from the perspective of a virtual camera, as shown in FIG. 2A. Additional detail regarding capturing and utilizing digital images of real-world objects or synthetic objects is provided below (e.g., in relation to FIGS. 4-5).

As shown in FIG. 2A, the camera 206 is positioned on the hemisphere 204 perpendicular to the object 202 (e.g., along the horizontal axis of the hemisphere 204). In some embodiments, the camera 206 is positioned off-center (i.e., not along the horizontal axis of the hemisphere 204) so as to have an angled view of the portion of the object 202 facing the hemisphere 204. Regardless of absolute position, however, the position of the camera relative to the object 202 can provide a reference from which to measure lighting directions.

As mentioned, the digital image capturing configuration 200 includes the first light source 208 and the second light source 210 positioned along the curved surface of the hemisphere. In particular, the position of each light source provides a direction of emitted light that approaches the object 202 at a measurable angle between the lighting direction and a plane containing the camera 206 and the object 202. For example, FIG. 2A illustrates that the position of the first light source 208 provides a first lighting direction 212, which approaches the object 202 at a first angle 214 between the first lighting direction 212 and the plane (represented by the dotted line 216) containing the object 202 and the camera 206. As can further be seen in FIG. 2A, the position of the second light source 210 provides a second lighting direction 218, which approaches the object 202 at a second angle 220 between the second lighting direction 218 and the plane.

In one or more embodiments, the image relighting system is configured to only accept input digital images portraying the object 202 illuminated from lighting directions that approach the object 202 at predetermined angles. Accordingly, the digital image capturing configuration 200 accommodates the image relighting system by fixing the position of each light source to provide the required angle. For example, the digital image capturing configuration 200 can fix the position of the first light source 208 so that the first lighting direction 212 approaches the object 202 at an angle of about thirty-five degrees in accordance with a configuration of the image relighting system. Likewise, the digital image capturing configuration 200 can fix the position of the second light source 210 so that the second lighting direction 218 approaches the object 202 at the same angle (i.e., from the same numerical angle below the object and the camera, but in a different quadrant of the hemisphere 204 and from a different lighting direction).

In some embodiments, however, the image relighting system is configured to accept input digital images portraying the object 202 illuminated from a lighting direction that approaches the object 202 from any angle within a predetermined range (hereinafter referred to as the "light direction range"). Accordingly, the image relighting system can position each light source anywhere along the curved surface of the hemisphere 204 to provide a lighting direction that approaches the object 202 within the predetermined light direction range. To illustrate, the image relighting system can define the light direction range to include any light direction that approaches the object 202 at an angle between twenty-five degrees and forty-five degrees. Accordingly, the digital image capturing configuration 200 can position each light source so that its emitted lighting direction falls somewhere within the predetermined light direction range (e.g., within a ten degree range from thirty-five degrees). In one or more embodiments, the image relighting system selects the desired lighting direction by sampling the predetermined light direction range and the image relighting system positions the light source to obtain the selected lighting direction.

The image relighting system can utilize a variety of different light direction ranges, depending on the embodiment. For example, although the foregoing example describes a light direction range of thirty-five degrees plus/minus ten degrees, the image relighting system can utilize a light direction range centered on a different angle (e.g., 30, 40, 45, or 50) with different variance (e.g., plus/minus 5 degrees, 15 degrees, or twenty degrees).

Although the foregoing example illustrates the first angle 214 at which the first lighting direction 212 approaches the object 202 and the second angle 220 at which the second lighting direction 218 approaches the object (as well as the angles at which the lighting directions provided by the two additional unseen light sources approach the object 202) are equivalent, in one or more embodiments, the image relighting system positions each light source so that the angle of approach is different from other light sources.

Although FIG. 2A illustrates a side view of the digital image capturing configuration 200 FIG. 2B illustrates backview of the digital image capturing configuration 200 (or a projection of the digital image capturing configuration 200 onto a two-dimensional plane). For example, FIG. 2B illustrates the object 202, the first light source 208, and the second light source 210 previously discussed. Additionally, FIG. 2B illustrates a third light source 232 and a fourth light source 234 not previously shown.

As can be seen in FIG. 2B, the digital image capturing configuration 200 is divided into quadrants using an x-axis 236 and a y-axis 238 with the object 202 positioned at the origin. In this view, each light source is positioned according to corresponding x and y coordinates. In one or more embodiments, the digital image capturing configuration 200 distributes the four light sources symmetrically about the origin so that the absolute value of the x coordinate for each light source is equal and the absolute value of the y coordinate for each light source is equal. However, in some embodiments, the digital image capturing configuration 200 does not distribute the light sources symmetrically. Additionally, in one or more embodiments, the digital image capturing configuration 200 positions each light source so that the absolute values of the x and y coordinates of the light source are equal (i.e., x=y or x=−y). However, in other embodiments, the digital image capturing configuration 200 does not apply such a restriction on the positions of the light sources.

In relation to FIG. 2B, the image relighting system captures input digital by illuminating the object 202 from the first lighting direction 212 utilizing the first light source 208 and capturing a first digital image of the object 202 using the camera 206. Subsequently, the image relighting system illuminates the object 202 from the second lighting direction 218 utilizing the second light source 210 separately (i.e., the first light source 208 is turned off or covered so that the first lighting direction 212 does not reach the object 202) and captures a second digital image of the object 202. The digital image capturing configuration 200 captures additional digital images of the object 202 as illuminated by a third and a fourth lighting direction provided by the third light source 232 and the fourth light source 234, respectively.

Though the above example discusses the digital image capturing configuration 200 in the context of one or more embodiments in which the image relighting system is configured to accept a set of four input digital images, other embodiments exist in which the image relighting system is configured to accept fewer or more input digital images. For example, in some embodiments, the image relighting system is configured to accept a set of five or six input digital images where each digital image portrays the object 202 illuminated from a light direction provided by one of five light sources. In other embodiments, the image relighting system is configured to accept three input digital images illuminated by three light directions. As discussed above, however, the image relighting system provides the capability of generating accurate target digital images based on small sets (i.e., five or fewer) of input digital images.

Figure 3:
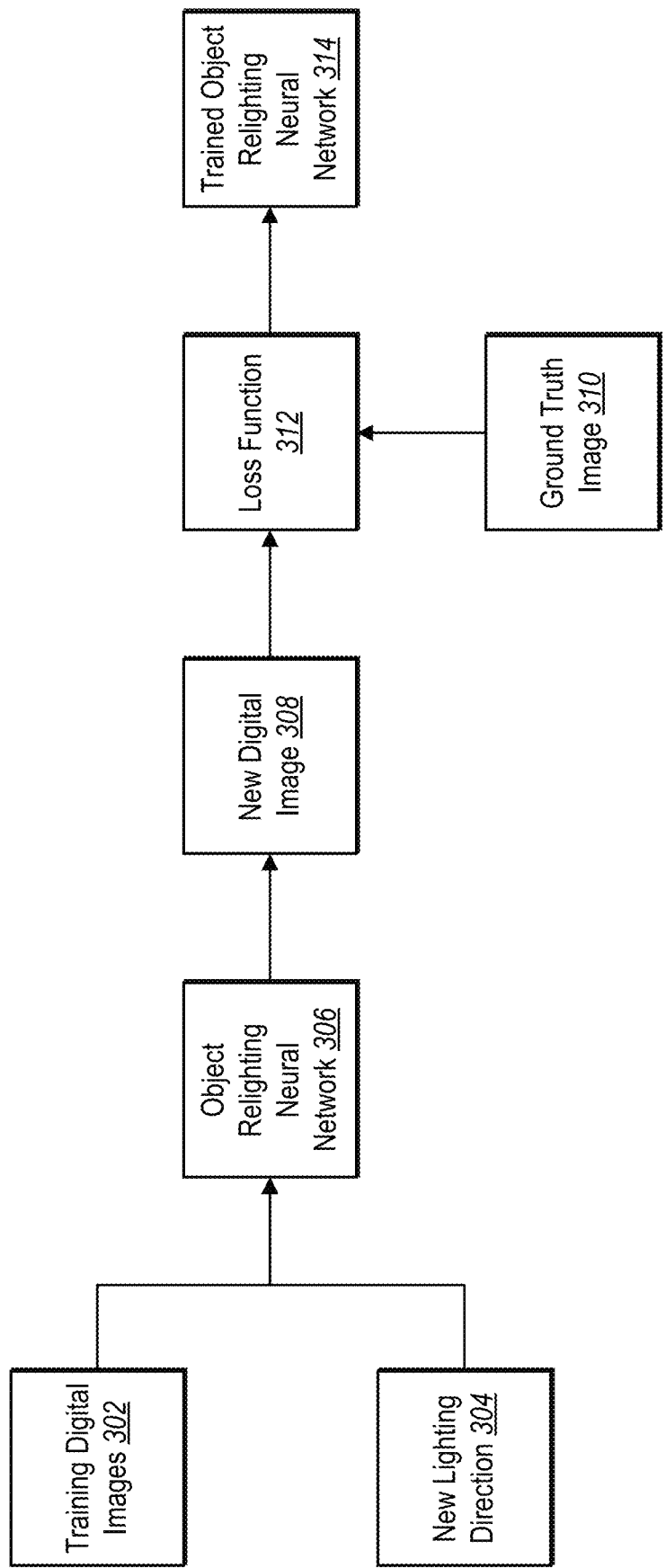
FIG. 3 illustrates a block diagram of training an object relighting neural network to generate target digital images in accordance with one or more embodiments.

As mentioned, in one or more embodiments, the image relighting system uses an object relighting neural network to generate a target digital image. In particular, the image relighting system can provide a set of input digital images (e.g., the set of input digital images captured using the digital image capturing configuration 200 of FIGS. 2A-2B) to the object relighting neural network, which subsequently generates the target digital image based on the input digital images. FIG. 3 illustrates a block diagram of the image relighting system training an object relighting neural network to generate target digital images in accordance with one or more embodiments.

As shown in FIG. 3, the image relighting system trains an object relighting neural network using training digital images 302. In particular, the training digital images 302 portray a training object illuminated from various lighting directions. For example, the training digital images 302 can include a first training digital image portraying the training object illuminated from a first lighting direction and a second training digital image portraying the training object illuminated from a second lighting direction. In some embodiments, the image relighting system trains the object relighting neural network using a number of training digital images that the object relighting neural network will be configured to accept as input digital images once trained.

FIG. 3 shows that the image relighting system also trains the object relighting neural network using a new lighting direction 304. The new lighting direction 304 indicates the lighting direction from which the training object should be illuminated in the resulting digital images. Indeed, the new lighting direction 304 differs from the lighting directions used in the training digital images 302. Accordingly, the object relighting neural network can generate an image of the training object illuminated by a previously unobserved lighting direction.

As illustrated in FIG. 3, the image relighting system provides the training digital images 302 and the new lighting direction 304 to the object relighting neural network 306 to generate a new digital image 308. Specifically, the image relighting system can analyze the training digital images 302 and the new lighting direction 304 at a variety of different levels of abstraction utilizing a plurality of layers of the object relighting neural network 306 to predict the new digital image 308. Accordingly, the new digital image 308 portrays a prediction by the object relighting neural network 306 of the training object illuminated from the new lighting direction 304. Additional detail regarding layers of the object relighting neural network 306 is provided below (e.g., in relation to FIG. 4).

As shown in FIG. 3, the image relighting system then compares the new digital image 308 with a ground truth image 310. The ground truth image 310 portrays the training object actually illuminated from the new lighting direction 304. To illustrate, for real world training objects, the image relighting system generates the ground truth image 310 by illuminating the training object using the new lighting direction 304 and capturing an image of the training object using a camera. For synthetic training objects, the image relighting system can render the training object as illuminated by the new lighting direction 304 and generate an image of the illuminated training object. More detail will be provided regarding obtaining the ground truth image 310 below.

As shown in FIG. 3, the image relighting system compares the new digital image 308 with the ground truth image 310 by applying a loss function 312. The loss function 312 determines the cost (i.e., error) resulting from the object relighting neural network 306 based on the difference between an estimated value (i.e., the new digital image 308)

and the true value (i.e., the ground truth image 310). The image relighting system can utilize a variety of loss functions, including a squared error loss function, a 0-1 indicator function, a cross entropy loss function, or a L2 loss function.

The image relighting system can train the object relighting neural network 306 based on the determined loss. For example, in one or more embodiments, the image relighting system back propagates the determined loss to the object relighting neural network 306 to modify its parameters. In one or more embodiments, the image relighting system modifies the parameters of each layer of the object relighting neural network. Consequently, with each iteration of training, the image relighting system gradually increases the accuracy of the object relighting neural network 306 (e.g., through gradient assent or gradient descent). As shown, the image relighting system can thus generate the trained object relighting neural network 314.

Additional detail regarding the object relighting neural network will now be provided. In general, the interaction between a target lighting direction and a scene (i.e., an object and the surrounding environment) to be generated as a target digital image can be predicted by directly modeling the light transport function of the scene. Assuming distant illumination, the light transport function, $T(x, \omega)$, maps incident illumination from direction $\omega$ to outgoing radiance at pixel x. By modelling the light transport function, a scene can be captured under a target lighting direction using equation 1 where $L(\omega)$ provides the radiance of the incident illumination from direction w:

$$I(x) = \int_{\mathcal{L}} T(x,\omega)L(\omega)d\omega \qquad (1)$$

The light transport function can be sampled by capturing images under different lighting conditions. For example, capturing an image of a scene under an individual lighting direction $\omega$ results in the sample $I_j(\bullet)=T(\bullet, \omega_j)$. A set of such samples $\{(I_j, \omega_j)|j=1, 2, \ldots, k\}$ can be used to generate the appearance of the scene $I_n$ under a target lighting direction $\omega_n$. Because the light transport function combines all the interactions of incident illumination with scene geometry and materials, the resulting image can generate photorealistic lighting effects.

In one or more embodiments, the image relighting system operates under various assumptions: the image of a scene is captured from a fixed viewpoint; illumination is distant; and the illumination from behind the scene makes a minimal contribution to the scene appearance and can be ignored. Under these assumptions, the image relighting system uses the light transport matrix, $T(x_i, \omega_j)$, of a scene to represent the proportion of incident radiance from direction $\omega$ (sampled from the upper hemisphere $\mathcal{L}$) that reaches pixel $x_i$. Images of the scene under an individual lighting direction represent column-wise samples of the light transport matrix (i.e., $I_j=T(:, \omega_j)$). Given a set of k such samples—images of the scene, $I_1, I_2, \ldots I_k$, captured under sample lighting directions $\omega_1, \omega_2, \ldots \omega_k$ respectively—the image relighting system can generate the image $I_n$ that results by illuminating the scene from the target lighting direction $\omega_n$ using relighting function $\Phi(\bullet)$:

$$I_n=((\omega_n;I_1,\omega_1;I_2,\omega_2;\ldots;I_k,\omega_k)=\Phi(\omega_n,S_1,S_2,\ldots S_k) \qquad (2)$$

Figure 4:
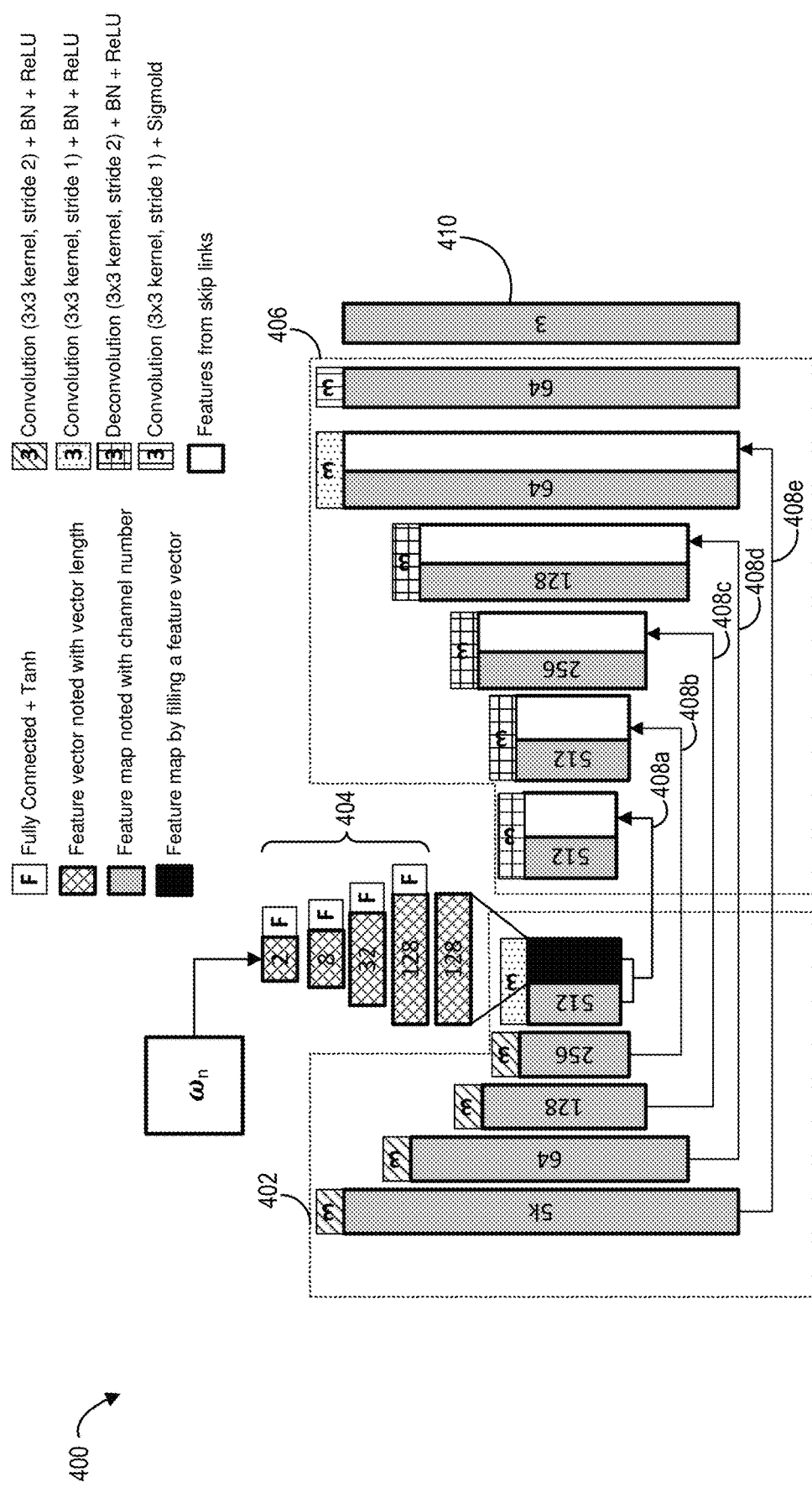
FIG. 4 illustrates an architecture of an object relighting neural network trained to generate target digital images in accordance with one or more embodiments.

The image relighting system can model the relighting function given in Equation 2 as an object relighting neural network. FIG. 4 illustrates the architecture 400 of an object relighting neural network (such as the object relighting neural network 306 of FIG. 3) trained to generate target digital images based on sets of input digital images (i.e., the set of sample images $\{(I_j, \omega_j)|j=1, 2, \ldots k\})$ and target lighting directions. In one or more embodiments, the object relighting neural network is a fully convolutional neural network. For example, as shown in FIG. 4, the object relighting neural network utilizes a U-net style encoder-decoder architecture that is made up, at least in part, of convolutional and deconvolutional layers. It should be noted that the neural network architecture illustrated in FIG. 4 applies to both the object relighting neural network while in training as well as the trained object relighting neural network.

As can be seen, FIG. 4 illustrates one or more embodiments in which the image relighting system provides input digital images and the lighting direction corresponding to each input digital image to the object relighting neural network. In particular, the image relighting system provides each input digital image to the object relighting neural network as a set of three color channels, each channel representing a color value of pixels of the input digital image. Additionally, the image relighting system provides the lighting direction $\omega$ to the object relighting neural network as a two-channel pair of coordinates $(x_j, y_j)$ representing the positioning of the lighting direction's corresponding light source as discussed above with reference to FIG. 2B.

By combining the two direction channels with the three color channels, the image relighting system generates a five-channel input for each input digital image. Thus, the image relighting system provides a 5k-channel input to the object relighting neural network. In some embodiments, the image relighting system uses input digital images that include fixed lighting directions (i.e., all sets of input digital images are captured using the same four or five lighting directions); therefore, the image relighting system configures the object relighting neural network to inherently process the input digital images as if they portrayed the fixed lighting directions. In such embodiments, the image relighting system does not provide the lighting directions for the input digital images. In such embodiments, the image relighting system provides a 3k-channel input that includes the color values of the input digital images.

As illustrated in FIG. 4, the image relighting system provides the set of input digital images as a 5k-channel input to the encoder 402 of the object relighting neural network, which processes the input using a series of convolutional layers (with stride two for downsampling) where each convolutional layer is followed by batch normalization (BN) and ReLU layers. Additionally, the image relighting system provides the target lighting direction $\omega_n$ to a set of fully-connected layers 404 (with tan h activation layers after each linear operation) to expand the two-dimensional vector $\omega=(x, y)$ into a 128-dimensional feature vector. The object relighting neural network replicates the feature vector spatially to construct a 128-channel feature map that is concatenated to the output of the encoder 402. The decoder 406 then convolves the concatenated encoder output and upsamples the features with deconvolution (i.e., transpose convolution) layers, where both convolution and deconvolution are followed by BN and ReLU layers. Skip connections 408a-408e are used between the encoder 402 and the decoder 406 to improve the per-pixel details in the output. In particular, the skip connections 408a-408e introduce high-frequency features into the output. The decoder 406 ends with two convolutional layers followed by a sigmoid activation to produce the target digital image 410 represented as a set of three output values defining the color values for each pixel of the target digital image.

The architecture 400 of the object relighting neural network shown in FIG. 4 provides several advantages. For example, the architecture 400 leverages two forms of coherence in the light transport matrix: the convolutional layers exploit spatial coherence by aggregating over the receptive fields of the object relighting neural network and combining feature maps across channels exploits correlations over lighting directions. Utilizing these coherences better configures the object relighting neural network to reproduce diffuse and specular reflectance, shadowing, and other global illumination effects.

More detail will now be provided regarding the training of the object relighting neural network. In one or more embodiments, the image relighting system trains the object relighting neural network using both images captured from synthetically generated scenes as well as captured images portraying real scenes including one or more real objects. In particular, the image relighting system can train the object relighting neural network using various training phases-a synthetic sphere phase, a single synthetic object phase, a composite synthetic objects phase, and a real object phase. In one or more embodiments, the image relighting neural network uses all of the above-mentioned phases to train the object relighting neural network. For example, the image relighting system can use each of the phases successively in a sequence of training phases. In one or more embodiments, the image relighting system begins with the most simple phase (i.e., the synthetic sphere phase) and progresses to the most complex phase (i.e., the real object phase). However, some embodiments involve reordering the training phases to create any sequence of training phases desired.

As mentioned above, the image relighting system can train the object relighting neural network using a synthetic sphere training phase. In particular, the image relighting system can generate a single synthetic (i.e., digital) sphere at the center of a synthetic scene. In one or more embodiments, the image relighting system additionally texturizes the sphere using a random texture crop either generated by the image relighting system or obtained from a pre-existing texture dataset. For example, the image relighting system can apply a texture crop to the synthetic sphere using a spatially varying bidirectional reflectance distribution function (SVBRDF). By generating and texturizing one or more synthetic spheres, the image relighting system generates a training set of synthetic spheres. In one or more embodiments, the image relighting system applies a different texture to each synthetic sphere.

For each synthetic sphere, the image relighting system renders a set of training digital images, each training digital image portraying the synthetic sphere illuminated from a different lighting direction. In one or more embodiments, the set of training digital images includes four or five training digital images in order to train the object relighting neural network to generate target digital images based on a set of four or five input digital images, respectively. In some embodiments, the set of training digital images includes more or less training digital images. In one more embodiments, each training digital image is rendered to portray the synthetic sphere illuminated from a fixed lighting direction. For example, each training digital image can portray the synthetic sphere as illuminated by a light source that is fixed in its position so as to provide a lighting direction that approaches the synthetic sphere at a fixed angle as discussed above with reference to FIG. 2A. In some embodiments, each training digital image is rendered to portray the synthetic sphere as illuminated by a variable lighting direction. For example, the image relighting system can position each light source anywhere that provides a lighting direction that approaches the synthetic sphere at an angle within a predetermined light direction range as discussed above with reference to FIG. 2A.

In one or more embodiments, the image relighting system additionally renders a set of ground truth images for each synthetic sphere. In particular, each ground truth image portrays the synthetic sphere illuminated from a different, new lighting direction, which the object relighting neural network will operate to reconstruct. In one or more embodiments, the image relighting system positions the light sources corresponding to the new lighting directions so that $\{(x, y) | -0.5 \leq x \leq 0.5, -0.5 \leq y \leq 0.5\}$ (where the hemisphere is a unit hemisphere). In one or more embodiments, each image in the set of training digital images and the set of ground truth images is rendered with a predetermined resolution (e.g., 256×256 or 512×512).

For each synthetic sphere, the image relighting system provides the set of training digital images and a new lighting direction corresponding to a new lighting direction rendered in one of the ground truth images to the object relighting neural network. In particular, the image relighting system sequentially provides the new lighting direction portrayed in each ground truth image so the object relighting neural network iteratively generates a new digital image corresponding to each ground truth image based on the set of training digital images. With each iteration, the image relighting system compares the new digital image to the corresponding ground truth image using a loss function. Subsequently, the image relighting system back propagates the determined loss to modify the parameters of the object relighting neural network as discussed above with reference to FIG. 3.

Figure 5A:
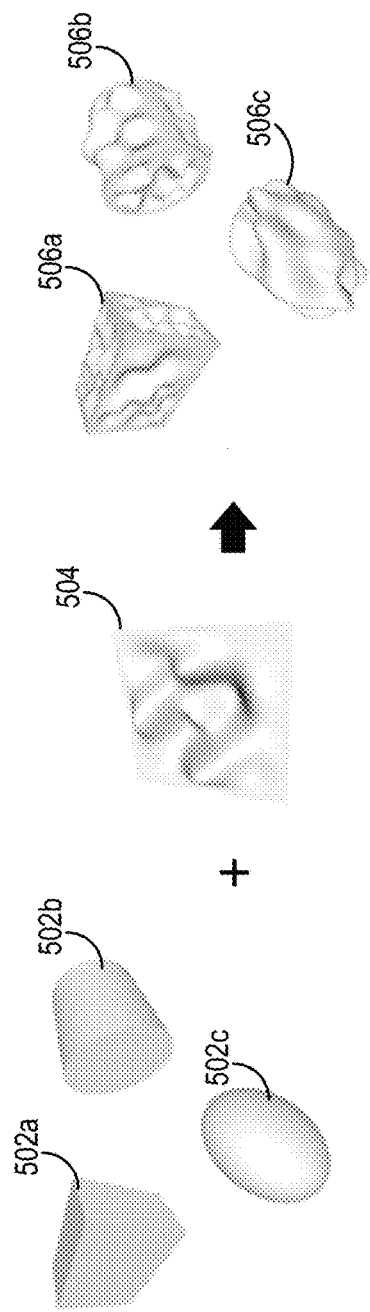
FIGS. 5A-5B illustrate generating digital objects to be used in training an object relighting neural network in accordance with one or more embodiments.

As mentioned above, the image relighting system can additionally, or alternatively, train the object relighting neural network using a single synthetic object training phase. In particular, in one or more embodiments, the image relighting system generates a digital object to use in training the object relighting neural network. FIG. 5A illustrates the image relighting system generating a digital object to be used in training the object relighting neural network in accordance with one or more embodiments. As seen in FIG. 5A, the image relighting system first generates one of a cube 502*a*, a cylinder 502*b*, or an ellipsoid 502*c*.

Subsequently, as shown by FIG. 5A, the image relighting system modifies the digital object by applying a variable height field 504 to obtain the corresponding modified cube 506*a*, modified cylinder 506*b*, or modified ellipsoid 506*c*. The variable height field 504 comprises a function that displaces portions or the entirety of the surface of a digital object. In particular, the variable height field 504 displaces different portions of the surface differently so as to generate an uneven surface of varying elevations. In one or more embodiments, the variable height field 504 randomly displaces portions of the surface of the digital object to obtain random elevations.

In one or more embodiments, the image relighting system additionally texturizes the digital object using a random texture crop as discussed above. By generating and texturizing one or more individual digital objects, the image relighting system generates a training set of digital objects. In some embodiments, the image relighting system applies a different texture to each digital object. Additionally, in some embodiments, one or more of the digital objects from the training set of digital objects differ in size.

Similar to the synthetic sphere training phase, the image relighting system renders a set of training digital images and a set of ground truth images for each digital object in the training set of digital objects. For each digital object, the image relighting system provides the set of training digital images and a new lighting direction corresponding to a new lighting direction rendered in one of the ground truth images to the object relighting neural network. In particular, the image relighting system sequentially provides the new lighting direction for each ground truth image so the object relighting neural network iteratively generates a new digital image corresponding to each ground truth image based on the set of training digital images. With each iteration, the image relighting system compares the new digital image to the corresponding ground truth image using a loss function. In one or more embodiments, the image relighting system compares the new digital image to the corresponding ground truth image by comparing a sampled patch (e.g., a 64×64 patch) of the new digital image to a corresponding patch of the ground truth image. After comparing the images, the image relighting system back propagates the determined loss to modify the parameters of the object relighting neural network as discussed above with reference to FIG. 3.

Figure 5B:
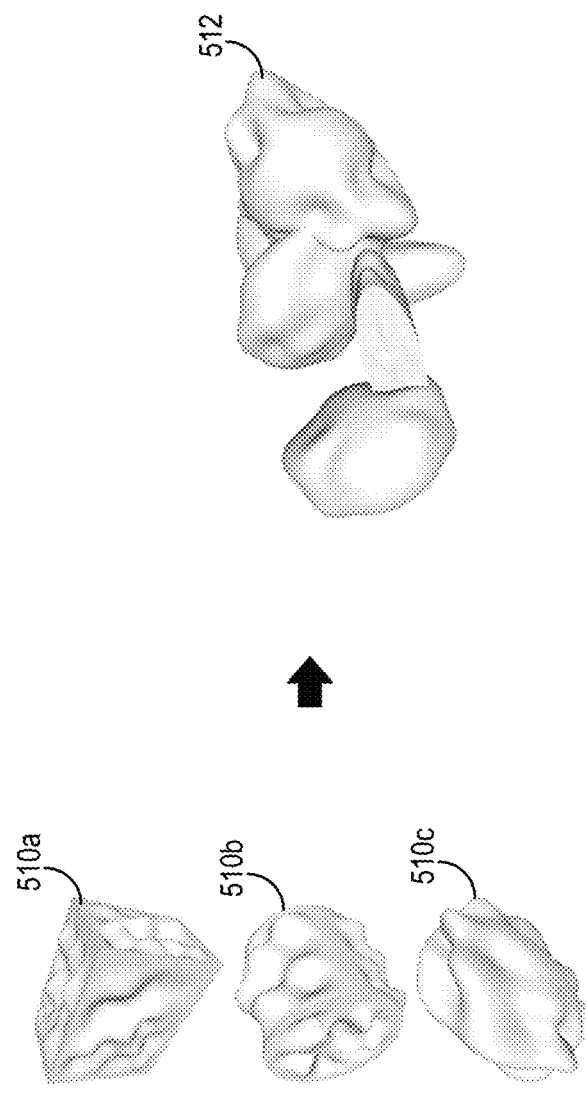

As further mentioned above, the image relighting system can additionally, or alternatively, train the object relighting neural network using a composite synthetic objects training phase. In particular, in one or more embodiments, the image relighting system generates composite synthetic objects from multiple digital objects to use in training the object relighting neural network. FIG. 5B illustrates the image relighting system generating a composite digital object for training the object relighting neural network in accordance with one or more embodiments. As seen in FIG. 5B, the image relighting system generates (as just described in relation to FIG. 5A) a first digital object 510a, a second digital object 510b, and a third digital object 510c for combination. In one or more embodiments, the image relighting system generates more or less digital objects to combine. In some embodiments, each of the digital objects 510a-510c have a different size.

After generating the digital objects 510a-510c, the image relighting system then modifies each digital object by applying a (random) orientation and a (random) translation to the object. In particular, the translation modifies a position of the digital object with respect to the center of the image. In one or more embodiments, the image relighting system additionally texturizes each digital object using a random texture crop as discussed above. Subsequently, the image relighting system combines the digital objects 510a-510c to generate a composite digital object 512. By generating additional composite digital objects, the image relighting system generates a training set of composite digital objects.

Similar to the synthetic sphere training phase and the single synthetic object training phase, the image relighting system renders a set of training digital images and a set of ground truth images for each composite digital object in the training set of combined digital objects. For each combined digital object, the image relighting system provides the set of training digital images and a new lighting direction corresponding to a new lighting direction rendered in one of the ground truth images to the object relighting neural network. In particular, the image relighting system sequentially provides the new lighting direction for each ground truth image so the object relighting neural network iteratively generates a new digital image corresponding to each ground truth image based on the set of training digital images. With each iteration, the image relighting system compares the new digital image to the corresponding ground truth image using a loss function. In one or more embodiments, the image relighting system compares the new digital image to the corresponding ground truth image by comparing a sampled patch (e.g., a 128×128 patch) of the new digital image to a corresponding patch of the ground truth image. After comparing the images, the image relighting system back propagates the determined loss to modify the parameters of the object relighting neural network as mentioned above.

As mentioned above, the image relighting system can additionally, or alternatively, train the object relighting neural network using a real object training phase. In particular, the image relighting system trains the object relighting neural network to generate target digital images portraying real objects illuminated from target lighting directions. In one or more embodiments, the image relighting system identifies one or more real objects to generate a training set of real objects.

For each real object in the training set of real objects, the image relighting system can identify a set of training digital images. In one or more embodiments, the image relighting system identifies the set of real objects by capturing an image of the real object while it is illuminated from a lighting direction. For example, the image relighting system can illuminate the real object from a first lighting direction to capture a first training digital image and then separately illuminate the real object from a second lighting direction to capture a second training digital image.

In one or more embodiments, each set of training digital images includes four or five training digital images but, in some embodiments, the set can include more or fewer training digital images. In one more embodiments, each training digital image from the set of training digital images portrays the real object illuminated from a fixed lighting direction. For example, each training digital image can portray the real object as illuminated by a light source that is fixed in its position so as to provide a lighting direction that approaches the real object at a fixed angle as discussed above with reference to FIG. 2A. In some embodiments, each training digital image is rendered to portray the real object as illuminated by a variable lighting direction. For example, the image relighting system can position each light source anywhere that provides a lighting direction that approaches the real object at an angle within a predetermined light direction range as discussed above with reference to FIG. 2A.

In one or more embodiments, the image relighting system additionally identifies a set of ground truth images for each real object. For example, the image relighting system can obtain a ground truth image by illuminating the real object from a new lighting direction and then capturing an image of the illuminated real object using a camera. In particular, each ground truth image portrays the real object illuminated from a different new lighting direction, which the object relighting neural network will operate to reconstruct. In one or more embodiments, the image relighting system positions the light sources corresponding to the new lighting directions so that the projection of each light source onto a two-dimensional plane follows the restriction $\{(x, y)|-0.5 \leq x \leq 0.5, -0.5 \leq y \leq 0.5\}$. In one or more embodiments, each image in the set of training digital images and the set of ground truth images is rendered with a predetermined resolution (e.g., 512×512).

For each real object, the image relighting system provides the set of training digital images and a new lighting direction corresponding to a new lighting direction rendered in one of the ground truth images to the object relighting neural network. In particular, the image relighting system sequentially provides the new lighting direction for each ground truth image so the object relighting neural network iteratively generates a new digital image corresponding to each ground truth image based on the set of training digital images. With each iteration, the image relighting system compares the new digital image to the corresponding ground truth image using a loss function. In one or more embodiments, the image relighting system compares the new digital image to the corresponding ground truth image by comparing a sampled patch (e.g., a 128×128 patch) of the new digital image to a corresponding patch of the ground truth image. After comparing the images, the image relighting system back propagates the determined loss to modify the parameters of the object relighting neural network as discussed above.

Thus, the image relighting system can train an object relighting neural network to generate target digital images based on a set of input digital images and a target lighting direction. The algorithms and acts described in reference to FIGS. 3-5B (including the discussion regarding the various training phases) can comprise the corresponding structure for performing a step for training an object relighting neural network to generate target digital images portraying one or more objects illuminated from target lighting directions. Additionally, the neural networks described in relation to FIG. 4 can comprise the corresponding structure for performing a step for training an object relighting neural network to generate target digital images portraying one or more objects illuminated from target lighting directions.

Figure 6:
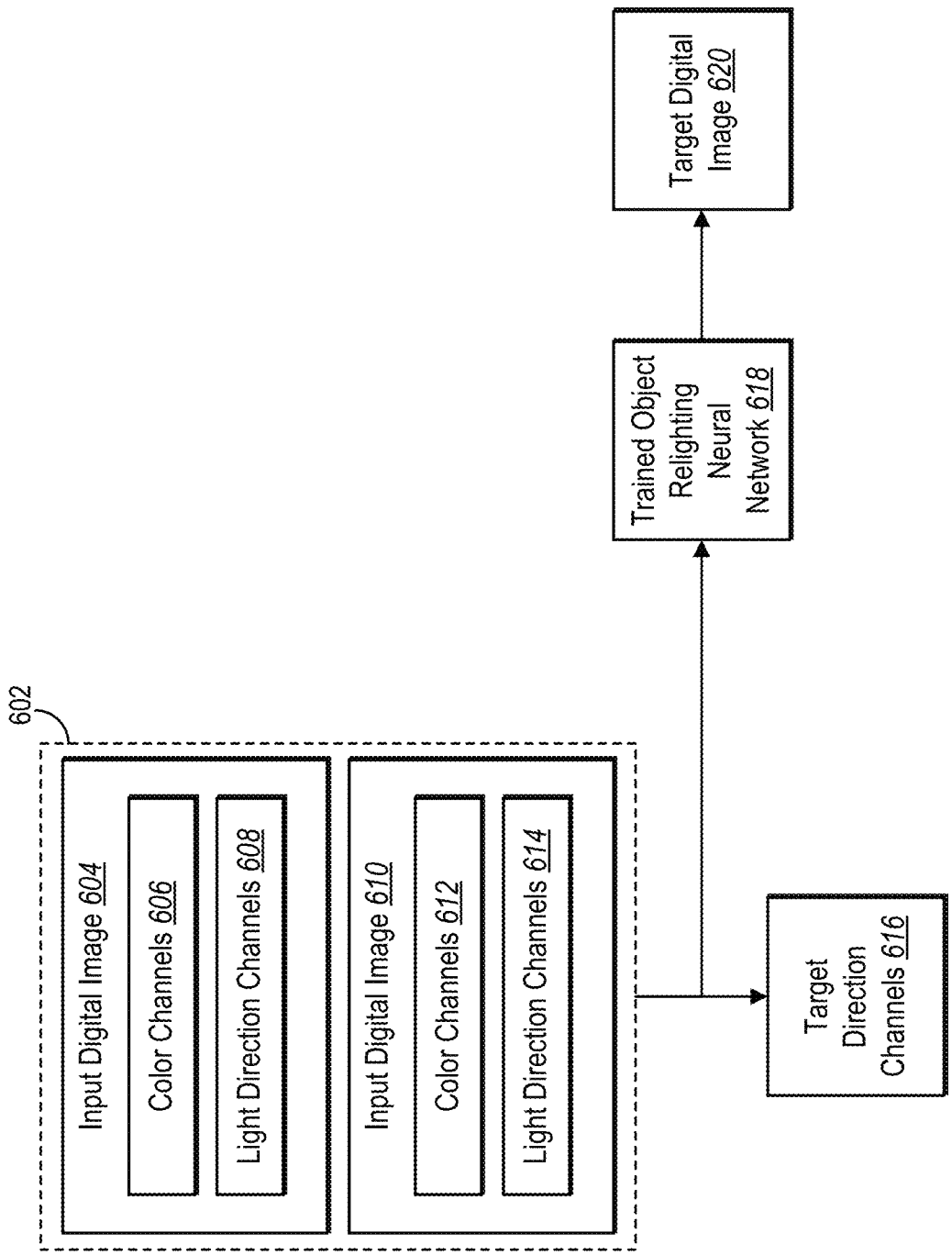
FIG. 6 illustrates a block diagram of utilizing a trained object relighting neural network to generate a target digital image in accordance with one or more embodiments.

Once trained, the image relighting system utilizes the object relighting neural network to generate target digital images portraying objects illuminated from target lighting directions. FIG. 6 illustrates a block diagram representing one or more embodiments in which the image relighting system uses the trained object relighting neural network to generate a target digital image. In one or more embodiments, the trained object relighting neural network 618 shown in FIG. 6 is the same as the trained object relighting neural network 314 illustrated in FIG. 3.

As shown in FIG. 6, the image relighting system provides a set of input digital images 602 and target direction channels 616 to the trained object relighting neural network 618. In particular, the set of input digital images 602 includes a first input digital image 604 and a second input digital image 610 (note, that the set of input digital images includes additional input digital images in some embodiments). Indeed, each input digital image portrays an object illuminated from a different lighting direction. For example, the first input digital image portrays the object illuminated from a first lighting direction and the second input digital image portrays the object illuminated from a second lighting direction.

As shown in FIG. 6, the first input digital image 604 includes the color channels 606 and the light direction channels 608. Similarly, the second input digital image 610 includes the color channels 612 and light direction channels 614. In particular, for each input digital image, the image relighting system generates a set of color channels representing color values reflecting pixels of the respective input digital image. For example, in one or more embodiments, the image relighting system generates a first set of color channels representing the color values of the pixels of the first input digital image. Additionally, for each input digital image, the image relighting system generates a set of light direction channels. In one or more embodiments, the set of light direction channels includes a pair of coordinates representing the position of the light source corresponding to the lighting direction. In some embodiments, the image relighting system does not provide light direction channels to the trained object relighting neural network 618.

Additionally, as mentioned, the image relighting system provides the set of target direction channels 616 to the trained object relighting neural network 618. In one or more embodiments, the set of target direction channels 616 includes a pair of coordinates representing the position of a light source providing the target lighting direction. After providing the set of input digital images 602 and the target direction channels 616, the image relighting system uses the trained object relighting neural network 618 to generate the target digital image 620. In particular, the object relighting neural network 618 analyzes the color channels 606, 612, the light direction channels 608,614, and the target direction channels 616 utilizing various layers (as illustrated in FIG. 4) with tuned parameters (as discussed in relation to FIGS. 3-5) to generate the target digital image 620. Thus, the target digital image 620 portrays the object illuminated by the target lighting direction corresponding to the target direction channels 616 based on the set of input digital images 602.

Figure 7A:
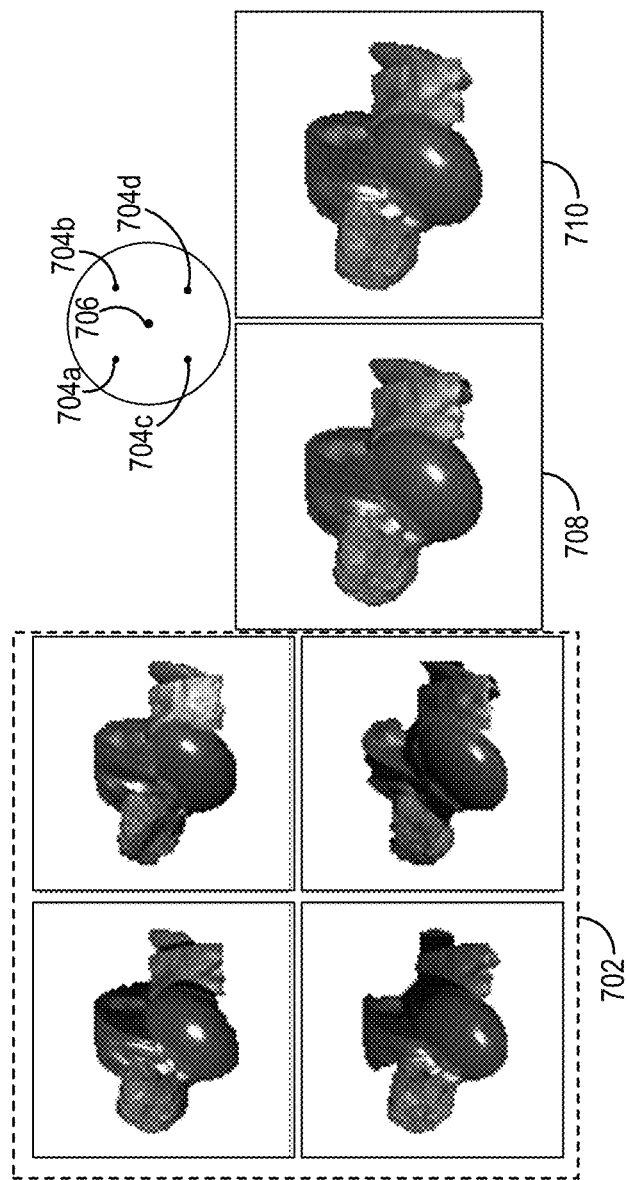
FIGS. 7A-7B illustrate input digital images and target digital images generated in accordance with one or more embodiments.

FIG. 7A illustrates an exemplary target digital image 708 generated by a trained object relighting neural network (e.g., the trained object relighting neural network 618) based on a set of input digital images 702. In particular, each input digital image from the set of input digital images 702 portrays a digital object (i.e., a composite digital object similar to one that would be generated during the composite synthetic objects training phase) illuminated from one of the lighting directions 704a-704d. The image relighting neural network provides the set of input digital images 702 and the target lighting direction 706 to the trained object relighting neural network. The trained object relighting neural network then generates the target digital image 708 portraying the digital object illuminated from the target lighting direction 706.

FIG. 7A additionally illustrates ground truth image 710. In particular, the ground truth image 710 portrays the digital object illuminated from the target lighting direction. Comparing the target digital image 708 with the ground truth image 710 shows the accuracy with which the image relighting system can generate target digital images based on a small set of input digital images.

Figure 7B:
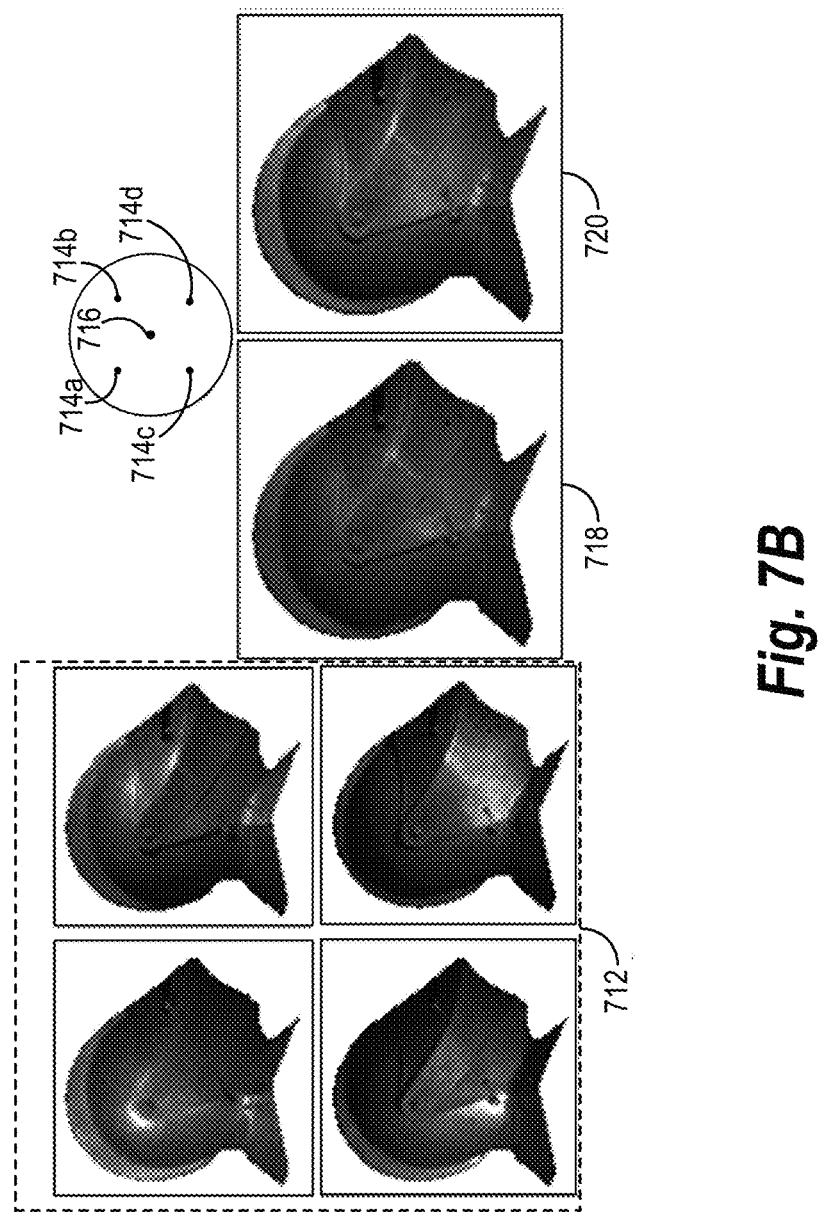

Similarly, FIG. 7B illustrates an exemplary target digital image 718 generated by a trained object relighting neural network based on the set of input digital images 712. In particular, each input digital image portrays a real object illuminated from one of the lighting directions 714a-714d. The image relighting system provides the set of input digital images 712 and the target lighting direction 716 to the trained object relighting neural network, which then generates the target digital image 718 portraying the real object illuminated from the target lighting direction 716. FIG. 7B also illustrates the ground truth image 720. In particular, the ground truth image 720 is a real image portraying the real object illuminated from the target lighting direction 716. Comparing the target digital image 718 with the ground truth image 720 shows the accuracy with which the image relighting system can generate target digital images portraying real objects based on a small set of input digital images.

Thus, the image relighting system can use a trained object relighting neural network including the components discussed in FIG. 4, FIG. 6, and FIG. 7 to generate a target digital image. The algorithms and acts described in reference to FIG. 6 and FIG. 7 can comprise the corresponding structure for performing a step for utilizing the object relighting neural network to generate a target digital image of the object illuminated from a target lighting direction based on the set of input digital images. Additionally, the neural networks described in relation to FIG. 4 can comprise the corresponding structure for performing a step for utilizing the object relighting neural network to generate a target digital image of the object illuminated from a target lighting direction based on the set of input digital images.

In one or more embodiments, the image relighting system uses a trained object relighting neural network to generate multiple target digital images, each target digital image portraying the same object illuminated from a different target lighting direction. The image relighting system can use the multiple target digital images to generate a modified digital image, portraying the object illuminated from a target light configuration. As used herein, the term "light configuration" refers to a combination of lighting directions. In particular, light configuration refers to a plurality of light sources with a plurality of light directions.

Figure 8:
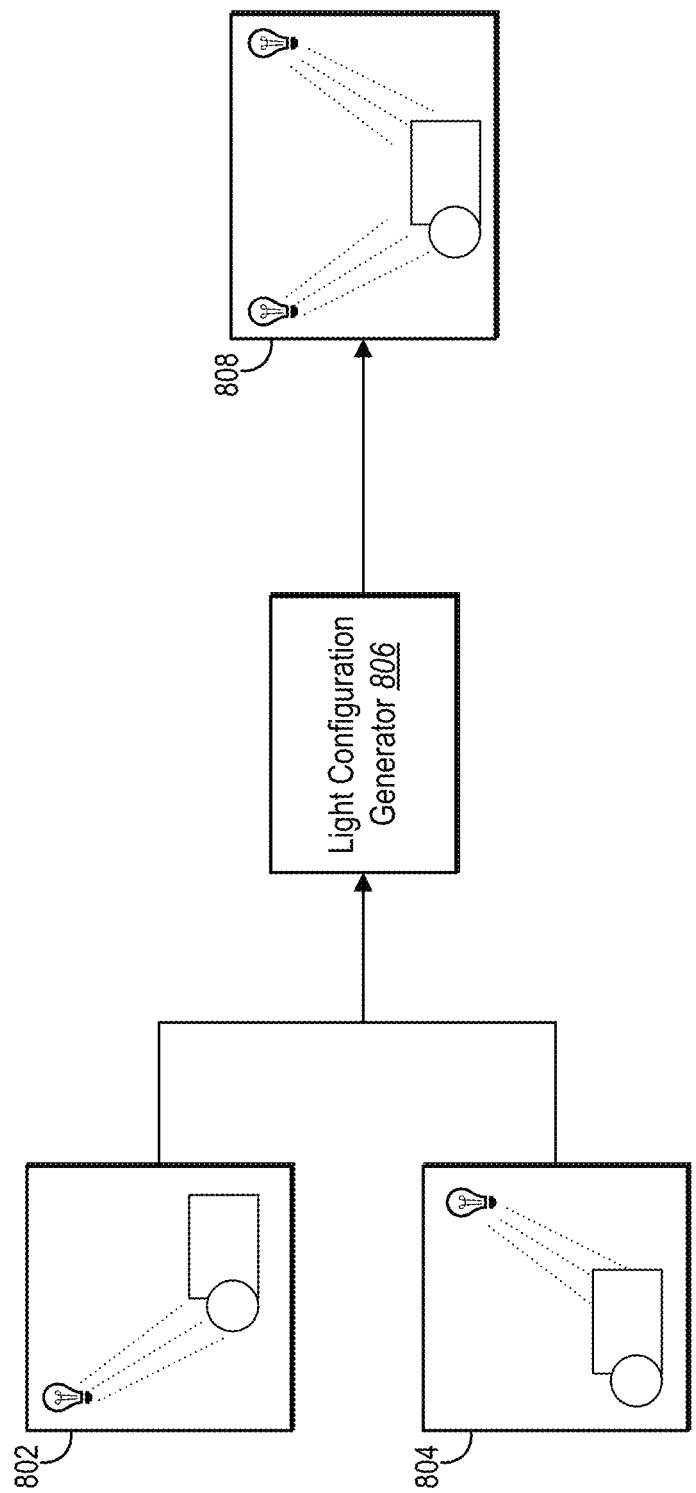
FIG. 8 illustrates a block diagram of generating a modified digital image in accordance with one or more embodiments.

For example, FIG. 8 illustrates a block diagram of the image relighting system generating a modified digital image in accordance with one or more embodiments. As seen in FIG. 8, the image relighting system provides a first target digital image 802 and a second target digital image 804 to a light configuration generator 806. In particular, the first target digital image 802 portrays the object illuminated from a first target lighting direction and the second target digital image 804 portrays the object illuminated from a second target lighting direction. The light configuration generator 806 uses the target digital images to generate the modified digital image 808.

In one or more embodiments, the light configuration generator 806 generates the modified digital image 808 by combining the first target digital image 802 and the second target digital image 804. For example, the light configuration generator 806 multiplies each target digital image according to the intensity of light provided by the corresponding target lighting direction (e.g., if the first target digital image 802 provides a target lighting direction with 100 units of light intensity, the light configuration generator 806 multiplies the first target digital image 802 by 100). Subsequently, the light configuration generator 806 adds each of the multiplied target digital images to obtain the modified digital image 808.

As can be seen by FIG. 8, the modified digital image 808 portrays the object illuminated by a target light configuration made of both the first target lighting direction portrayed in the first target digital image 802 and the second target lighting direction portrayed in the second target digital image 804. Though FIG. 8 illustrates the light configuration generator 806 generating the modified digital image 808 based on two target digital images, the light configuration generator 806 can generate modified digital images based on any number of target digital images.

In this manner, the image relighting system can generate a digital image of an object having any light configuration with any number of light sources having any number of light directions. Indeed, with five or fewer input digital images, the image relighting system can generate target digital images, each portraying an object illuminated from a different lighting direction. The image relighting system can then combine the target digital images to generate a modified digital image portraying the object illuminated from all of the lighting directions shown in the target digital images.

Figure 9:
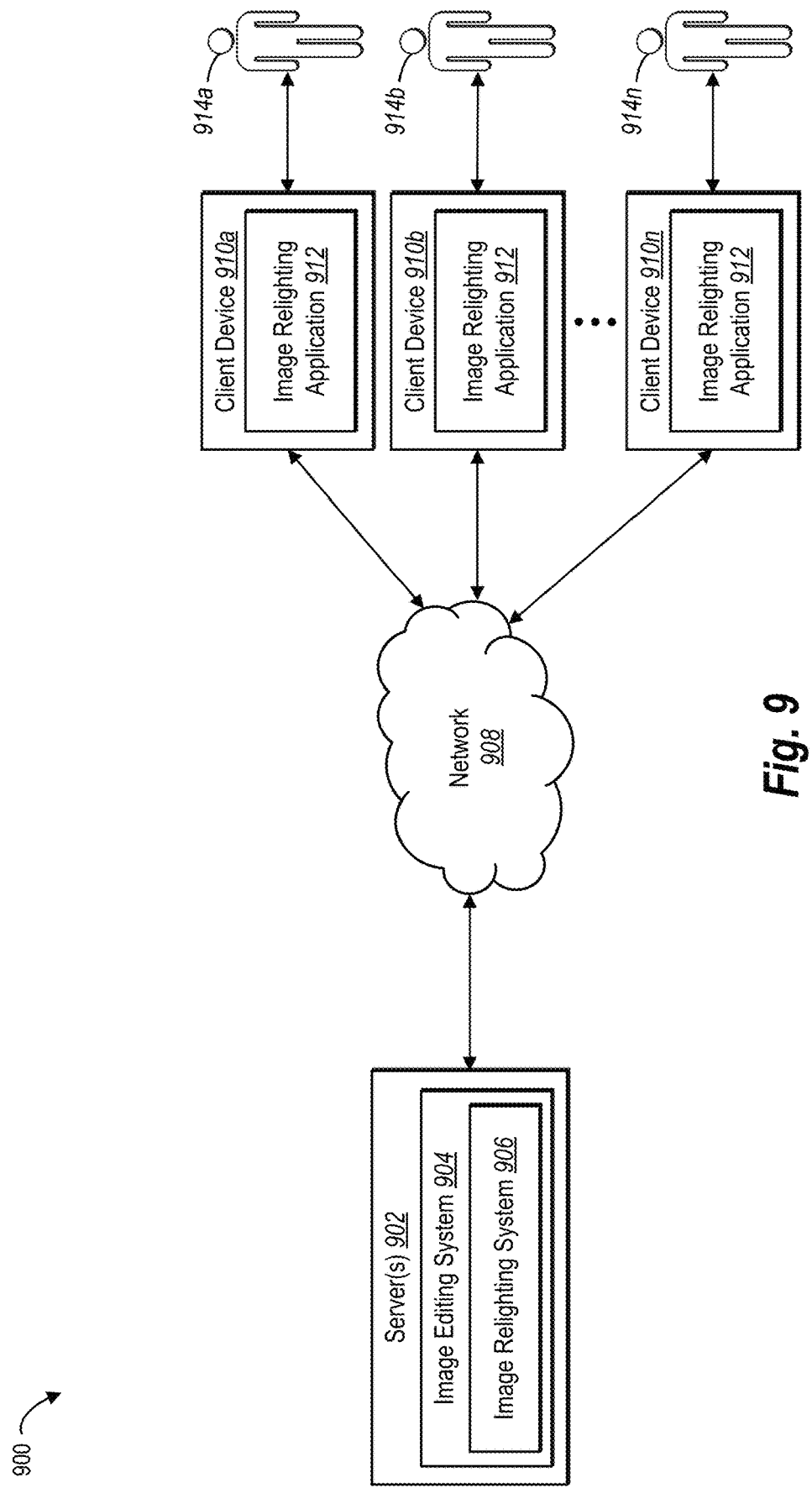
FIG. 9 illustrates an example environment in which an image relighting system can operate in accordance with one or more embodiments.

Turning now to FIG. 9, further information will be provided regarding implementation of the image relighting system. Specifically, FIG. 9 illustrates a schematic diagram of an exemplary system environment ("environment") 900 in which an image relighting system 906 can be implemented. As illustrated in FIG. 9, the environment 900 can include a server(s) 902, a network 908, client devices 910a-910n, and users 914a-914n.

Although, FIG. 9 illustrates a particular number of client devices, it will be appreciated that the environment 900 can include any number of computing devices (few or greater than shown). Similarly, although FIG. 9 illustrates a particular arrangement of the server(s) 902, the network 908, the client devices 910a-910n, and the users 914a-914n, various additional arrangements are possible.

The server(s) 902, the network 908, and the client devices 910a-910n may be communicatively coupled with each other either directly or indirectly (e.g., through the network 908, discussed in greater detail below in relation to FIG. 13). Moreover, the server(s) 902 and the client devices 910a-910n may include any type of computing device (including one or more computing devices as discussed in greater detail below in relation to FIG. 13).

As mentioned above, the environment 900 includes the server(s) 902. The server(s) 902 can generate, store, receive, and/or transmit any type of data, including the set of input digital images 104 and the target lighting direction 114. For example, the server(s) 902 can receive data from the client device 910a and send the data to the client device 910b. In one or more embodiments, the server(s) 902 comprises a data server. The server(s) 902 can also comprise a communication server or a web-hosting server.

As shown in FIG. 9, the server(s) 902 can include the image editing system 904. In particular, the image editing system 904 provides functionality by which a user (e.g., any of the users 914a-914n) can generate, edit, manage, and/or store digital images. For example, the user 914a can generate a new digital image using the client device 910a. Subsequently, the user 914a uses the client device 910a to send the digital image to the image editing system 904 hosted on the server(s) 902 via the network 908. The image editing system 904 then provides many options that the user 914a can use to edit the digital image, store the digital image, and subsequently search for, access, and view the digital image.

Additionally, the server(s) 902 can include the image relighting system 906. In particular, in one or more embodiments, the image relighting system 906 uses the server(s) 902 to generate target digital images portraying objects illuminated from target lighting directions. For example, the image relighting system 906 can use the server(s) 902 to receive a set of input digital images and a new lighting direction and then generate a target digital image.

For example, the server(s) 902 can receive a set of input digital images where each input digital image portrays an object illuminated from a different lighting direction. The server(s) 902 can additionally receive a target lighting direction, instructing the server(s) 902 from which lighting direction a user desires to illuminate the object. The server(s) 902 then uses the input digital images and the target lighting direction to generate a target digital image portraying the object illuminated from the target lighting direction. In one or more embodiments, the server(s) 902 further generates multiple target digital images where each target digital image portrays the object illuminated from a different target lighting direction. Subsequently, the server(s) 902 can generate a modified digital object portraying the object illuminated by a target light configuration based on the multiple target digital images.

As illustrated by the previous example embodiments, the image relighting system 906 can be implemented in whole, or in part, by the individual elements of the environment 900. Although FIG. 9 illustrates the image relighting system 906 implemented with regards to the server(s) 902, it will be appreciated that components of the image relighting system 906 can be implemented in any of the components of the environment 900. The components of the image relighting system will be discussed in more detail with regard to FIG. 10 below.

In one or more embodiments, the client devices 910a-910n include computer devices that allow users of the devices (e.g., the users 914a-914n) to access and interact with digital images. For example, the client devices 910a-910n can include smartphones, tablets, desktop computers, laptop computers, or other electronic devices. The client devices 910a-910n can include one or more applications (e.g., the image relighting application 912) that allows users 914a-914n to access and interact with digital images. For example, the image relighting application 912 can include a software application installed on the client devices 910a-910n. Additionally, or alternatively, the image relighting application 912 can include a software application hosted on the server(s) 902, which may be accessed by the client devices 910a-910n through another application, such as a web browser.

Figure 10:
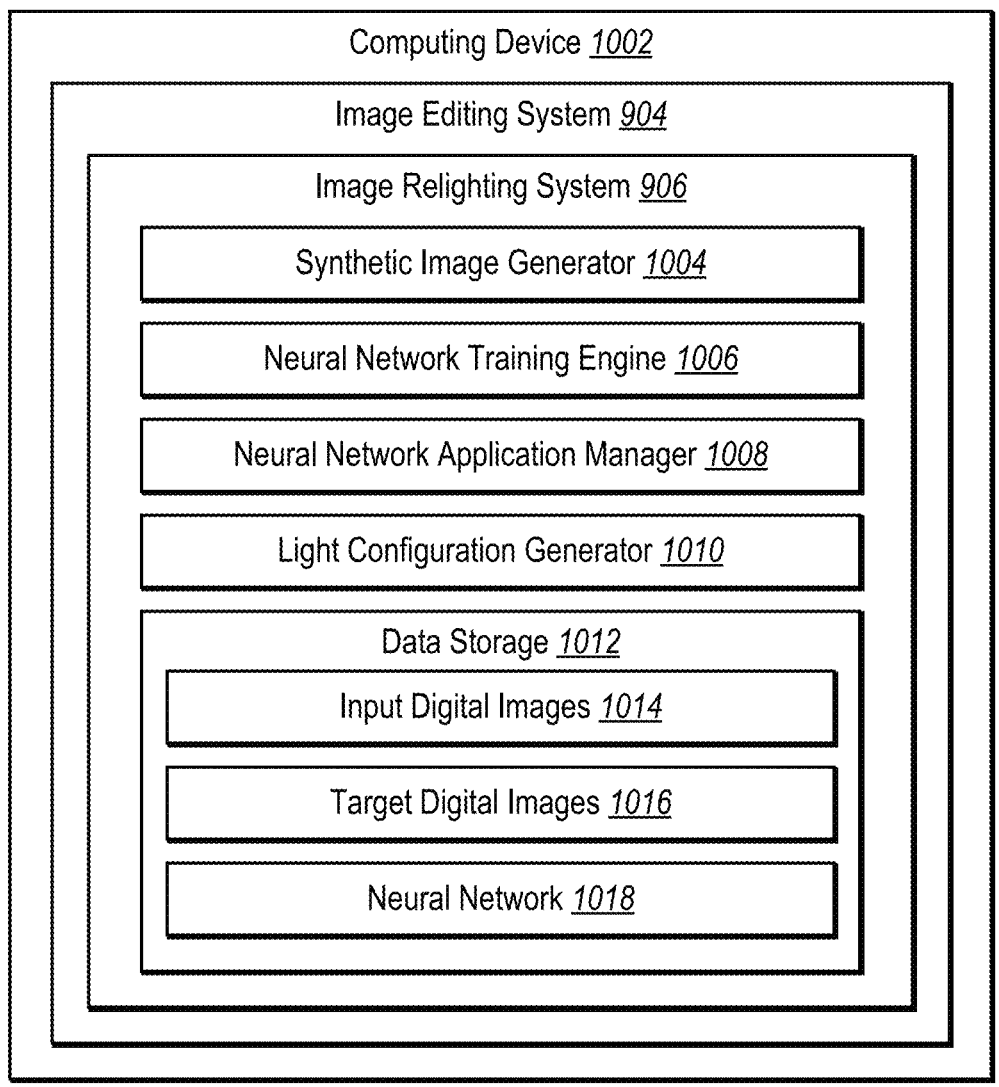
FIG. 10 illustrates an example schematic diagram of an image relighting system in accordance with one or more embodiments.

Turning now to FIG. 10, additional detail will be provided regarding various components and capabilities of the image relighting system 906. In particular, FIG. 10 illustrates the image relighting system 906 implemented by the computing device 1002 (e.g., the server(s) 902 and/or the client devices 910a-910n as discussed above with reference to FIG. 9). Additionally, the image relighting system 906 is also part of the image editing system 904. As shown, the image relighting system 906 can include, but is not limited to, a synthetic image generator 1004, a neural network training engine 1006, a neural network application manager 1008, a light configuration generator 1010, and data storage 1012 (which includes input digital images 1014, target digital images 1016, and neural network 1018).

As just mentioned, and as illustrated in FIG. 10, the image relighting system 906 includes the synthetic image generator 1004. In particular, the synthetic image generator 1004 generates digital objects and images of digital objects used in training an object relighting neural network. For example, the synthetic image generator 1004 can generate a digital object (which can either include an individual digital object or a combination of individual digital objects) as discussed with reference to FIGS. 5A-5B. The synthetic image generator 1004 can then generate images of the digital object illuminated from one of various lighting directions. These images can be used either as training digital images or ground truth images used for training the object relighting neural network.

As shown in FIG. 10, the image relighting system 906 also includes the neural network training engine 1006. In particular, the neural network training engine 1006 trains an object relighting neural network to generate target digital images portraying objects illuminated from target lighting directions. For example, the neural network training engine 1006 trains the object relighting neural network 306 using the training digital images 302 and the new lighting direction 304 as discussed with reference to FIG. 3. In one or more embodiments, the training digital images 302 include synthetic images generated by the synthetic image generator 1004.

As shown in FIG. 10, the image relighting system 906 also includes the neural network application manager 1008. In particular, the neural network application manager 1008 uses the object relighting neural network trained by the neural network training engine 1006. For example, the neural network application manager 1008 applies a set of input digital images and a target lighting direction to the trained object relighting neural network to generate a target digital image portraying an object illuminated from a target lighting direction.

Additionally, as shown in FIG. 10, the image relighting system 906 includes the light configuration generator 1010. In particular, the light configuration generator 1010 generates a modified digital image portraying an object illuminated by a target light configuration. For example, the light configuration generator 1010 can utilize the target digital images generated by the neural network application manager 1008 to generate the modified digital image. In one or more embodiments, the target light configuration is based on a configuration on the target lighting direction portrayed in each of the target digital images.

Further, as shown in FIG. 10, the image relighting system 906 includes data storage 1012. In particular, data storage 1012 includes input digital images 1014, target digital images 1016, and neural network 1018. Input digital images 1014 can store all images provided to an object relighting neural network. For example, the input digital images can include the training digital images and the ground truth images (e.g., the images generated by the synthetic image generator 1004) provided to train an object relighting neural network. Additionally, input digital images 1014 includes the input digital images provided to a trained object relighting neural network (via the neural network application manager 1008) in generating a target digital image. Target digital images 1016 include the target digital images generated by the object relighting neural network (via the neural network application manager 1008). In one or more embodiments, target digital images 1016 also includes new digital images generated as the object relighting neural network is trained. Further, data storage 1012 includes neural network 1018. In particular, neural network 1018 stores the object relighting neural network trained by the neural network training engine 1006 and applied by the neural network application manager 1008. For example, neural network 1018 stores the architecture of the object relighting neural network as well as the associated parameters.

The components 1004-1018 and their corresponding elements can comprise software, hardware, or both. For example, the components 1004-1018 and their corresponding elements can comprise one or more instructions stored on a computer-readable storage medium and executable by processors of one or more computing devices. The components 1004-1018 and their corresponding elements can comprise hardware, such as a special purpose processing device to perform a certain function or group of functions. Additionally, or alternatively, the components 1004-1018 and their corresponding elements can comprise a combination of computer-executable instructions and hardware.

Furthermore, the components 1004-1018 of the image relighting system 906 may, for example, be implemented as one or more stand-alone applications, as one or more modules of an application, as one or more plug-ins, as one or more library functions or functions that may be called by other applications, and/or as a cloud-computing model. Thus, the components 1004-1018 of the image relighting system 906 may be implemented as a stand-alone application, such as a desktop or mobile application. Furthermore, the components 1004-1018 of the image relighting system 906 may be implemented as one or more web-based applications hosted on a remote server. Alternatively, or additionally, the components of the image relighting system 906 may be implemented in a suite of mobile device applications or "apps." For example, in one or more embodiments, the image relighting system 906 can comprise or operate in connection with digital software applications such as ADOBE® CREATIVE CLOUD® or ADOBE® PHOTOSHOP®. "ADOBE," "CREATIVE CLOUD," and "PHOTOSHOP" are either registered trademarks or trademarks of Adobe Systems Incorporated in the United States and/or other countries.

Figure 11:
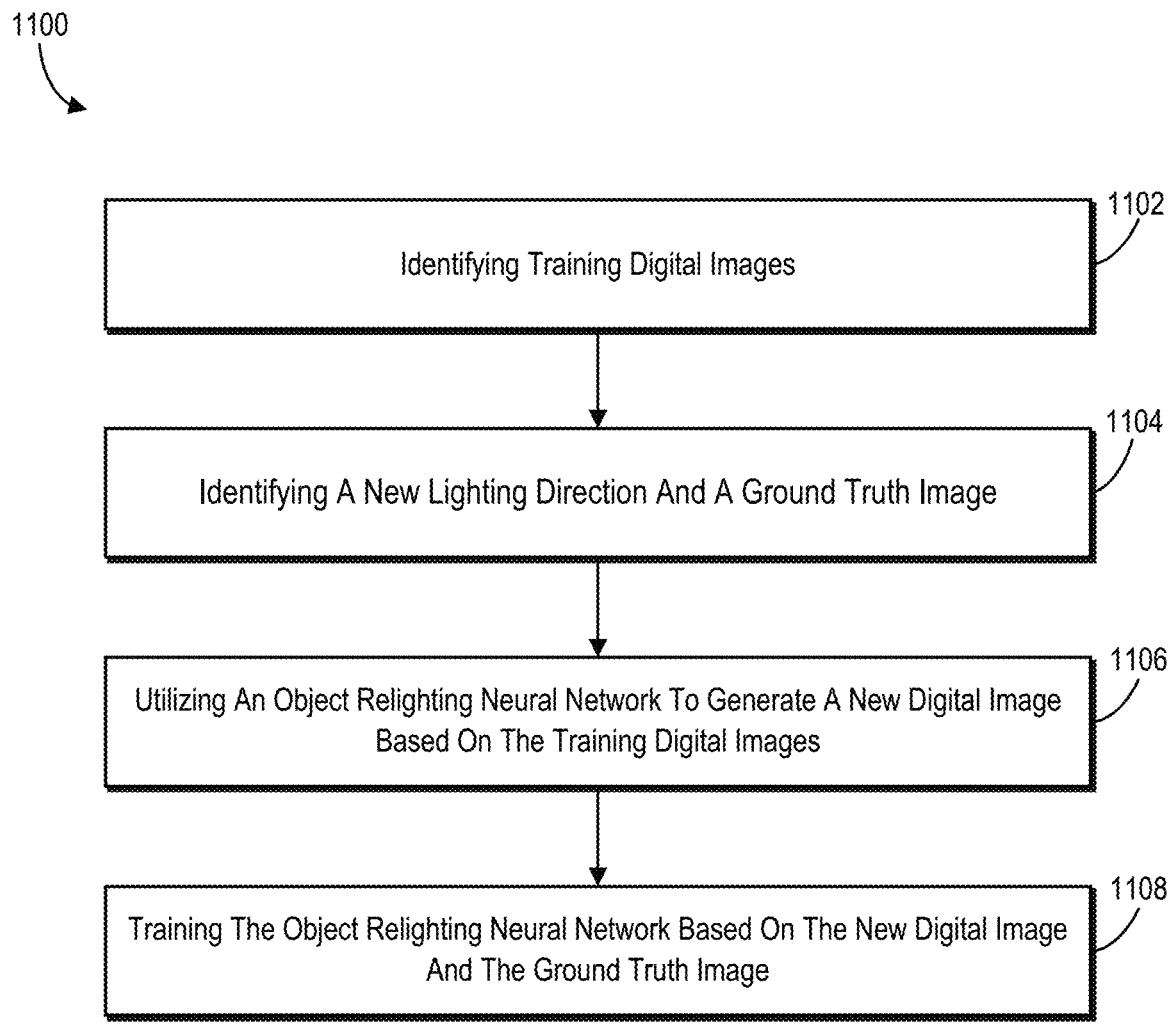
FIG. 11 illustrates a flowchart of a series of acts of training an object relighting neural network in accordance with one or more embodiments.

Turning now to FIG. 11, this figure illustrates a series of acts 1100 performed by the image relighting system to train an object relighting neural network to generate target digital objects. While FIG. 11 illustrates acts according to one embodiment, alternative embodiments may omit, add to, reorder, and/or modify any of the acts shown in FIG. 11. The acts of FIG. 11 can be performed as part of a method. In one or more embodiments, a non-transitory computer readable medium can comprise instructions that, when executed by one or more processors, cause a computing device to perform the acts of FIG. 11. In still further embodiments, a system can perform the acts of FIG. 11.

The series of acts 1100 includes an act 1102 of identifying training digital images. For example, the act 1102 involves identifying a set of training digital images of a training object, the set of training digital images comprising a first training digital image of the training object illuminated from a first lighting direction and a second training digital image of the training object illuminated from a second lighting direction. One or more embodiments involve identifying the set of training digital images of a digitally rendered object by generating a synthetic set of training digital images of a digitally rendered object. For example, in one or more embodiments, generating the synthetic set of training digital images includes generating a digital object; modifying the digital object by applying a variable height field to the digital object; generating the first training digital image by rendering a first illumination of the modified digital object from the first lighting direction; and generating the second training digital image by rendering a second illumination of the modified digital object from the second light direction. In some embodiments, generating the synthetic set of training digital images of a digitally rendered object involves generating a first digital object with a first size and a second digital object with a second size; modifying the first digital object by applying a first orientation and a first translation to the first digital object; modifying the second digital object by applying a second orientation and a second translation to the second digital object; and combining the modified first digital object and the modified second digital object to generate the digitally rendered object. The image relighting system then renders a first and second illumination of the digitally rendered object to generate the first and second training digital image, respectively.

The series of acts 1100 also includes an act 1104 of identifying a new light direction and a ground truth image. For example, the act 1104 involves identifying a new lighting direction and a ground truth image of the training object illuminated from the new lighting direction.

The series of acts 1100 further includes an act 1106 of utilizing an object relighting neural network to generate a new digital image based on the training digital images. For example, the act 1106 involves utilizing the object relighting neural network to generate a new digital image portraying the training object illuminated from the new lighting direction based on the set of training digital images, the first lighting direction, and the second lighting direction. In some embodiments, utilizing the object relighting neural network to generate the new digital image involves generating a plurality of training color channels corresponding to a plurality of training digital images portraying an object illuminated from a plurality of lighting directions and providing the plurality of training color channels to the object relighting neural network. For example, in one or more embodiments, utilizing the object relighting neural network to generate the new digital image involves generating a first set of color channels comprising color values reflecting pixels of the first training digital image; generating a first set of direction channels comprising coordinates corresponding to the first lighting direction; generating a second set of color channels comprising color values reflecting pixels of the second training digital image; generating a second set of direction channels comprising coordinates corresponding to the second lighting direction; and providing the first set of color channels, the second set of color channels, the first set of direction channels, and the second set of direction channels to the object relighting neural network. In some embodiments, the image relighting system further generates a set of new direction channels comprising coordinates corresponding to the new lighting direction; provides the set of new direction channels to the object relighting neural network; and then utilizes the object relighting neural network to generate the new digital image further based on the set of new direction channels.

The series of acts 1100 also include an act 1108 of training the object relighting neural network based on the new digital image and the ground truth image. For example, the act 1108 involves modifying parameters of the object relighting neural network by comparing the new digital image portraying the training object illuminated from the new lighting direction with the ground truth image of the training object illuminated from the new lighting direction.

Figure 12:
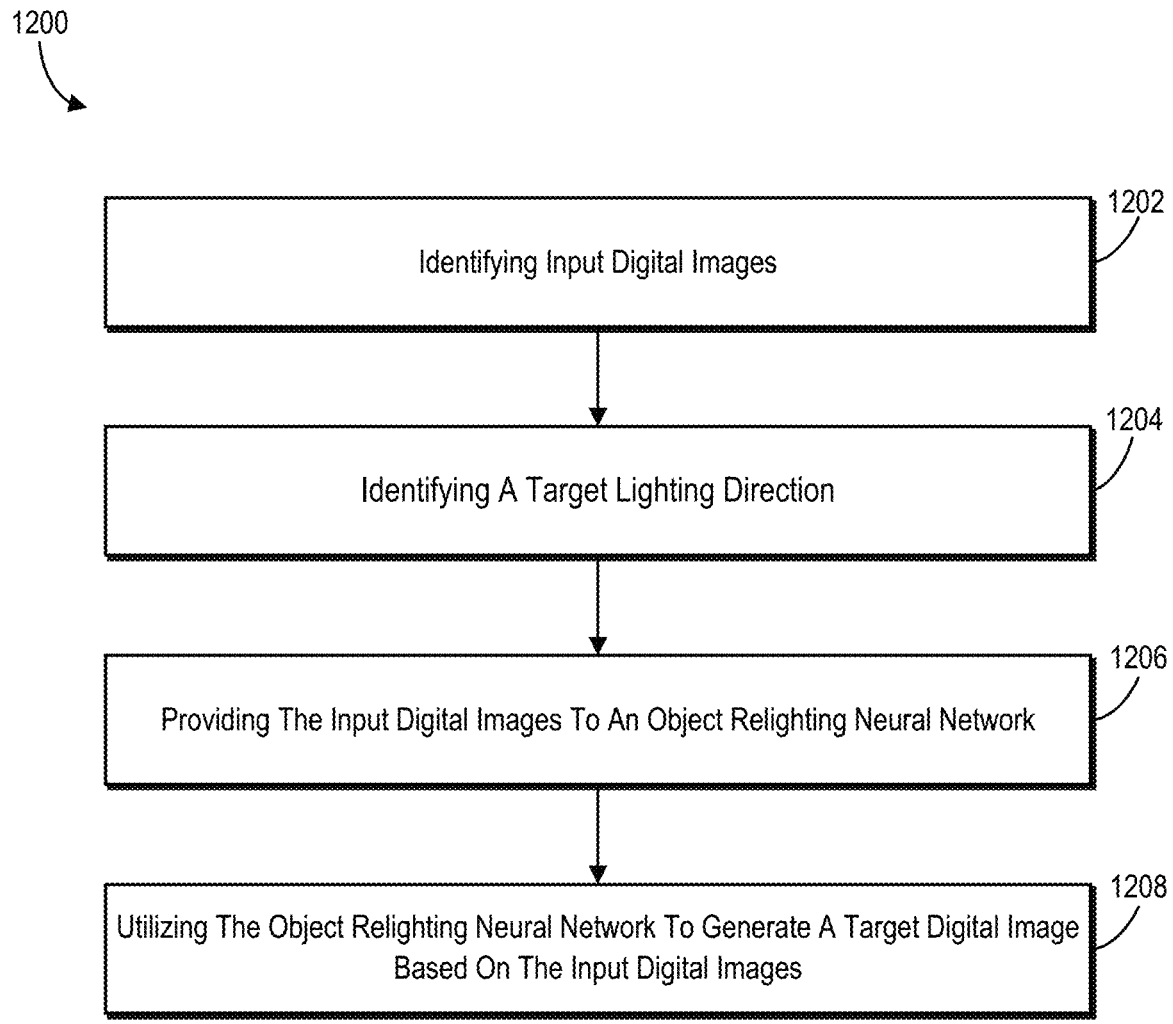
FIG. 12 illustrates a flowchart of a series of acts of utilizing a trained object relighting neural network in accordance with one or more embodiments.

Turning now to FIG. 12, this figure illustrates a series of acts 1200 performed by the image relighting system to utilize a trained object relighting neural network to generate target digital objects. While FIG. 12 illustrates acts according to one embodiment, alternative embodiments may omit, add to, reorder, and/or modify any of the acts shown in FIG. 12. The acts of FIG. 12 can be performed as part of a method. In one or more embodiments, a non-transitory computer readable medium can comprise instructions that, when executed by one or more processors, cause a computing device to perform the acts of FIG. 12. In still further embodiments, a system can perform the acts of FIG. 12.

The series of act 1200 includes an act 1202 of identifying input digital images. For example, the act 1202 involves identifying a set of input digital images portraying an object, the set of input digital images comprising a first input digital image portraying the object illuminated from a first lighting direction and a second input digital image portraying the object illuminated from a second lighting direction. In one or more embodiments, the first lighting direction corresponds to a first light source and the second lighting direction corresponds to a second light source. In some embodiments, the image relighting system determines the lighting directions to be portrayed in the first and second input digital images by identifying a first predetermined light direction range and a second predetermined light direction range; selecting the first lighting direction by sampling from the first predetermined light direction range; and select the second lighting direction by sampling from the second predetermined light direction range. In one or more embodiments, the set of input digital images consists of five or fewer input digital images.

In some embodiments, the image relighting system identifies the set of input digital images portraying the object by illuminating the object from the first lighting direction; capturing a first digital image of the object illuminated from the first lighting direction; illuminating the object from the second lighting direction without the first lighting direction; and capturing a second digital image of the object illuminated from the second lighting direction.

The series of acts 1200 also includes the act 1204 of identifying a target lighting direction. For example, the act 1204 involves determining a target lighting direction different from the first lighting direction and the second lighting direction.

The series of acts 1200 further includes the act 1206 of providing the input digital images to an object relighting neural network. For example, the act 1206 involves providing the set of input digital images to an object relighting neural network trained based on training digital images portraying objects illuminated by training lighting directions and ground truth digital images portraying the objects illuminated by additional lighting directions. In one or more embodiments, the image relighting system provides the set of input digital images to the object relighting neural network by generating a first set of color channels comprising color values reflecting pixels of the first input digital image and generating a first set of direction channels comprising coordinates corresponding to the first lighting direction. In some embodiments, the image relighting system further generates a second set of color channels comprising color values reflecting pixels of the second input digital image; generates a second set of direction channels comprising coordinates corresponding to the second lighting direction; and provides the first set of color channels, the second set of color channels, the first set of direction channels, and the second set of direction channels to the object relighting neural network. In further embodiments, the image relighting system also generates a set of target direction channels comprising coordinates corresponding to the target lighting direction and provides the set of target direction channels to the object relighting neural network. In one or more embodiments, the object relighting neural network includes a fully convolutional neural network.

Additionally, the series of acts 1200 includes the act 1208 of utilizing the object relighting neural network to generate a target digital image based on the input digital images. For example, the act 1208 involves utilizing the object relighting neural network to generate a target digital image of the object illuminated from the target direction based on the set of input digital images, the first lighting direction, and the second lighting direction. In some embodiments, the image relighting system utilizes the object relighting neural network to generate the target digital image further based on the set of target direction channels.

In one or more embodiments, the series of acts 1200 further includes utilizing the object relighting neural network to generate an additional target digital image and generating modified digital image based on the target digital image and additional target digital image (not shown). For example, these acts involve determining an additional target lighting direction different from the first lighting direction, the second lighting direction, and the target lighting direction; utilizing the object relighting neural network to generate an additional target digital image of the object illuminated from the additional target lighting direction based on the set of input digital images, the first lighting direction, and the second lighting direction; and based on the target digital image and the additional target digital image, generating a modified digital image portraying the object illuminated by a target light configuration comprising a first light source from the target lighting direction and a second light source from the additional target lighting direction.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
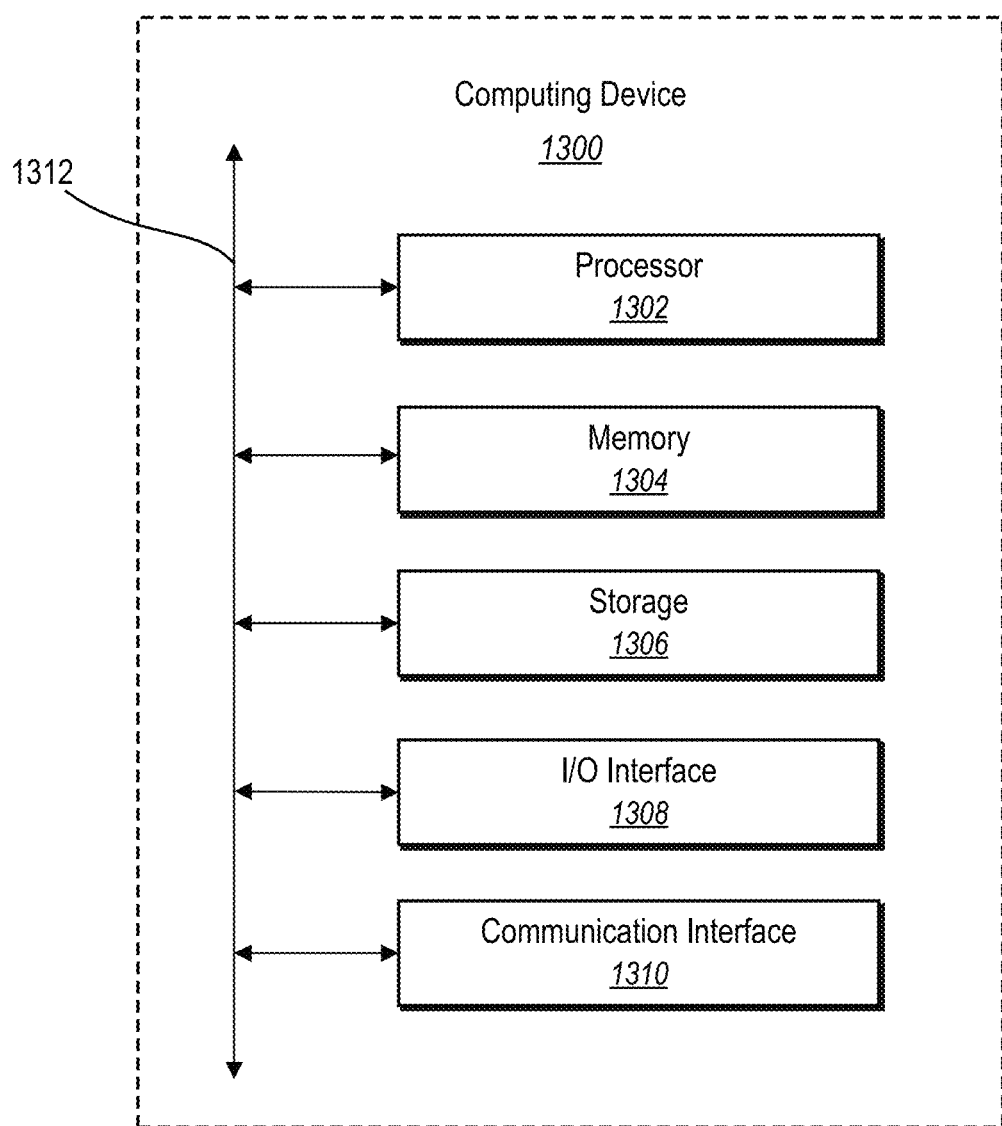
FIG. 13 illustrates a block diagram of an exemplary computing device in accordance with one or more embodiments.

FIG. 13 illustrates a block diagram of exemplary computing device 1300 that may be configured to perform one or more of the processes described above. One will appreciate that server(s) 902 and/or client devices 910a-910n may comprise one or more computing devices such as computing device 1300. As shown by FIG. 13, computing device 1300 can comprise processor 1302, memory 1304, storage device 1306, I/O interface 1308, and communication interface 1310, which may be communicatively coupled by way of communication infrastructure 1312. While an exemplary computing device 1300 is shown in FIG. 13, the components illustrated in FIG. 13 are not intended to be limiting. Additional or alternative components may be used in other embodiments. Furthermore, in certain embodiments, computing device 1300 can include fewer components than those shown in FIG. 13. Components of computing device 1300 shown in FIG. 13 will now be described in additional detail.

In particular embodiments, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage device 1306 and decode and execute them. In particular embodiments, processor 1302 may include one or more internal caches for data, instructions, or addresses. As an example and not by way of limitation, processor 1302 may include one or more instruction caches, one or more data caches, and one or more translation lookaside buffers (TLBs). Instructions in the instruction caches may be copies of instructions in memory 1304 or storage device 1306.

Memory 1304 may be used for storing data, metadata, and programs for execution by the processor(s). Memory 1304 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1304 may be internal or distributed memory.

Storage device 1306 includes storage for storing data or instructions. As an example and not by way of limitation, storage device 1306 can comprise a non-transitory storage medium described above. Storage device 1306 may include a hard disk drive (HDD), a floppy disk drive, flash memory, an optical disc, a magneto-optical disc, magnetic tape, or a Universal Serial Bus (USB) drive or a combination of two or more of these. Storage device 1306 may include removable or non-removable (or fixed) media, where appropriate. Storage device 1306 may be internal or external to computing device 1300. In particular embodiments, storage device 1306 is non-volatile, solid-state memory. In other embodiments, Storage device 1306 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1308 allows a user to provide input to, receive output from, and otherwise transfer data to and receive data from computing device 1300. I/O interface 1308 may include a mouse, a keypad or a keyboard, a touch screen, a camera, an optical scanner, network interface, modem, other known I/O devices or a combination of such I/O interfaces. I/O interface 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 1308 is configured to provide graphical data to a display for presentation to a user. The graphical data may be representative of one or more graphical user interfaces and/or any other graphical content as may serve a particular implementation.

Communication interface 1310 can include hardware, software, or both. In any event, communication interface 1310 can provide one or more interfaces for communication (such as, for example, packet-based communication) between computing device 1300 and one or more other computing devices or networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, communication interface 1310 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1310 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1310 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1312 may include hardware, software, or both that couples components of computing device 1300 to each other. As an example and not by way of limitation, communication infrastructure 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method for generating digital images portraying objects under target lighting conditions based on prior digital images portraying objects under prior lighting conditions, comprising:

generating, utilizing an object relighting neural network, a concatenated feature map by combining features extracted from a set of input digital images portraying an object and features generated from a target lighting direction, wherein the set of input digital images comprise images that light the object from respective lighting directions and the target lighting direction differs from the lighting directions of the set of input digital images; and generating, from the concatenated feature map, a target digital image comprising the object illuminated from the target lighting direction utilizing the object relighting neural network.

2. The method of claim 1, further comprising concatenating, for a given input digital image, color channels and a respective lighting direction to generate a multiple channel input.

3. The method of claim 2, further comprising combining multiple channel inputs for the set of input digital images to generate an encoder input, and wherein generating the concatenated feature map comprises downsampling the encoder input utilizing an encoder of the object relighting neural network.

4. The method of claim 3, further comprising generating a feature map from the target lighting direction by expanding the target lighting direction into a feature vector and replicating the feature vector spatially to construct the feature map.

5. The method of claim 4, wherein generating the concatenated feature map comprises concatenating the feature map with the downsampled encoder input.

6. The method of claim 1, wherein generating the target digital image comprising the object illuminated from the target lighting direction comprises upsampling the concatenated feature map utilizing a decoder of the object relighting neural network.

7. The method of claim 6, further comprising utilizing skip connections to combine output from layers of an encoder of the object relighting neural network used to generate the concatenated feature map with output from layers of the decoder to introduce high-frequency features into the output of the decoder.

8. The method of claim 1, wherein the set of input digital images comprises five or fewer digital images.

9. A non-transitory computer readable storage medium storing instructions thereon that, when executed by at least one processor, cause a computing device to:
generate, utilizing an encoder of an object relighting neural network, a first feature map from a set of input digital images portraying an object, the set of input digital images comprising two or more images lighting the object from respective lighting directions;
generate, utilizing a set of neural network layers, a second feature map from a target lighting direction, the target lighting direction differing from the lighting directions of the input digital images;
generate a concatenated feature map by combining the first feature map and the second feature map; and
generate, from the concatenated feature map, a target digital image comprising the object illuminated from the target lighting direction utilizing a decoder of the object relighting neural network.

10. The non-transitory computer readable storage medium of claim 9, wherein the instructions, when executed by the at least one processor, cause the computing device to generate the first feature map by utilizing convolutional layers of the encoder to combine feature maps generated from the set of input digital images across channels.

11. The non-transitory computer readable storage medium of claim 9, wherein the instructions, when executed by the at least one processor, cause the computing device to generate the first feature map by utilizing convolutional layers of the encoder to aggregate over receptive fields of the object relighting neural network.

12. The non-transitory computer readable storage medium of claim 9, wherein the target digital image comprise one or more of specularities, cast shadows, or reflections generated based on the target lighting direction.

13. The non-transitory computer readable storage medium of claim 9, wherein the target lighting direction comprises multiple lighting directions and the target digital image comprises the object illuminated from the multiple lighting directions.

14. The non-transitory computer readable storage medium of claim 9, further comprising instructions that, when executed by the at least one processor, cause the computing device to utilize skip connections to combine output from layers of the encoder of the object relighting neural network with output from layers of the decoder to introduce high-frequency features into the output of the decoder.

15. The non-transitory computer readable storage medium of claim 9, further comprising instructions that, when executed by the at least one processor, cause the computing device to generate the second feature map from the target lighting direction by expanding the target lighting direction into a feature vector and replicating the feature vector spatially to construct the second feature map.

16. A system for generating digital images portraying objects under target lighting conditions based on prior digital images portraying objects under prior lighting conditions, comprising:
at least one storage device storing:
a set of input digital images, each input digital image comprising an object illuminated from a respective lighting direction; and
an object relighting neural network comprising an encoder, a decoder, and a set of fully connected layers;
at least one computing device configured to cause the system to:
generate, utilizing the encoder, a first feature map from the set of input digital images;
generate, utilizing the set of fully connected layers, a second feature map from a target lighting direction, the target lighting direction differing from the lighting directions of the input digital images;
generate a concatenated feature map by combining the first feature map and the second feature map; and
generate, from the concatenated feature map, a target digital image comprising the object illuminated from the target lighting direction utilizing the decoder.

17. The system of claim 16, wherein:
the encoder comprises a series of convolutional layers, where each convolutional layer is followed by batch normalization and rectified linear unit layers; and
the at least one computing device is further configured to cause the system to generate the first feature map by downsampling encoder input comprising color channels based on red-green-blue pixel values of the input digital images and direction channels based on the lighting directions of the input digital images.

18. The system of claim 16, wherein:
the set of fully connected layers comprise tan h activation layers; and
the at least one computing device is further configured to cause the system to generate the second feature map by expanding the target lighting direction into a feature vector and replicating the feature vector spatially to construct the second feature map.

19. The system of claim 18, wherein:
the decoder comprises a set of deconvolutional layers followed by one or more convolutional layers and a sigmoid activation; and
the at least one computing device is further configured to cause the system to generate the target digital image by upsampling the concatenated feature map utilizing the set of deconvolutional layers.

20. The system of claim 16, wherein the at least one computing device is further configured to cause the system to generate the target digital image by utilizing skip connections to combine output from the set of fully connected layers of the encoder with output from set of deconvolutional layers of the decoder to introduce high-frequency features into the output of the decoder.

* * * * *